(12) United States Patent
Ottensmeyer et al.

(10) Patent No.: US 9,595,208 B2
(45) Date of Patent: Mar. 14, 2017

(54) TRAUMA TRAINING SIMULATOR WITH EVENT-BASED GESTURE DETECTION AND INSTRUMENT-MOTION TRACKING

(71) Applicant: The General Hospital Corporation, Boston, MA (US)

(72) Inventors: Mark P. Ottensmeyer, Watertown, MA (US); Gianluca De Novi, Cambridge, MA (US); Gregory J. Loan, Arlington, VA (US); Ryan Scott Bardsley, Manchester, MA (US); John Cho Moore, San Francisco, CA (US)

(73) Assignee: The General Hospital Corporation, Boston, MA (US)

( * ) Notice: Subject to any disclaimer, the term of this patent is extended or adjusted under 35 U.S.C. 154(b) by 413 days.

(21) Appl. No.: 14/446,980

(22) Filed: Jul. 30, 2014

(65) Prior Publication Data

US 2015/0037775 A1 Feb. 5, 2015

Related U.S. Application Data

(60) Provisional application No. 61/860,397, filed on Jul. 31, 2013, provisional application No. 61/861,179, filed on Aug. 1, 2013.

(51) Int. Cl.
*G09B 23/28* (2006.01)
*G09B 23/30* (2006.01)
*G09B 23/34* (2006.01)

(52) U.S. Cl.
CPC .......... *G09B 23/30* (2013.01); *G09B 23/286* (2013.01); *G09B 23/34* (2013.01)

(58) Field of Classification Search
USPC ........................................................ 434/271
See application file for complete search history.

(56) References Cited

U.S. PATENT DOCUMENTS

2014/0315174 A1* 10/2014 Sassani .................. G09B 23/28
434/262

* cited by examiner

*Primary Examiner* — Kesha Frisby
(74) *Attorney, Agent, or Firm* — Yakov Sidorin, Esq.; Quarles & Brady LLP

(57) ABSTRACT

Surgical trauma training simulator system including replaceable trauma module structured to mimic a portion of human anatomy and, in particular, a prosthetic anatomical structure containing a periorbital structure that includes an eye-lid and an eye globe in cooperation with a drive mechanism. The system is structured to provide, in operation, an event-driven surgical gesture recognition-based tracking of the simulation of the surgical procedure by the trainee and, in absence of expert trainer, provide visual feedback comparing the tracked simulation with correct sequence of steps of such procedure.

20 Claims, 19 Drawing Sheets

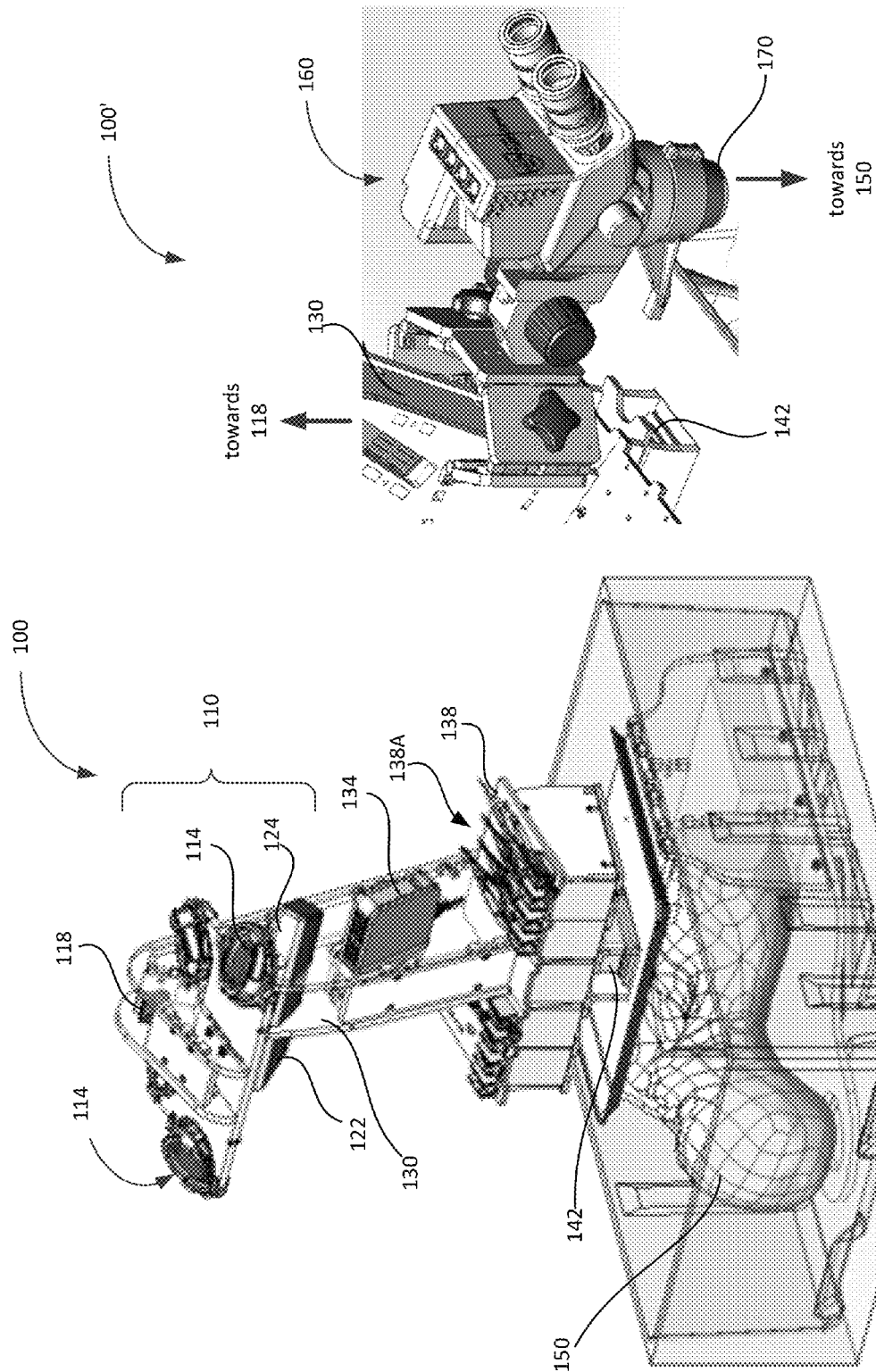

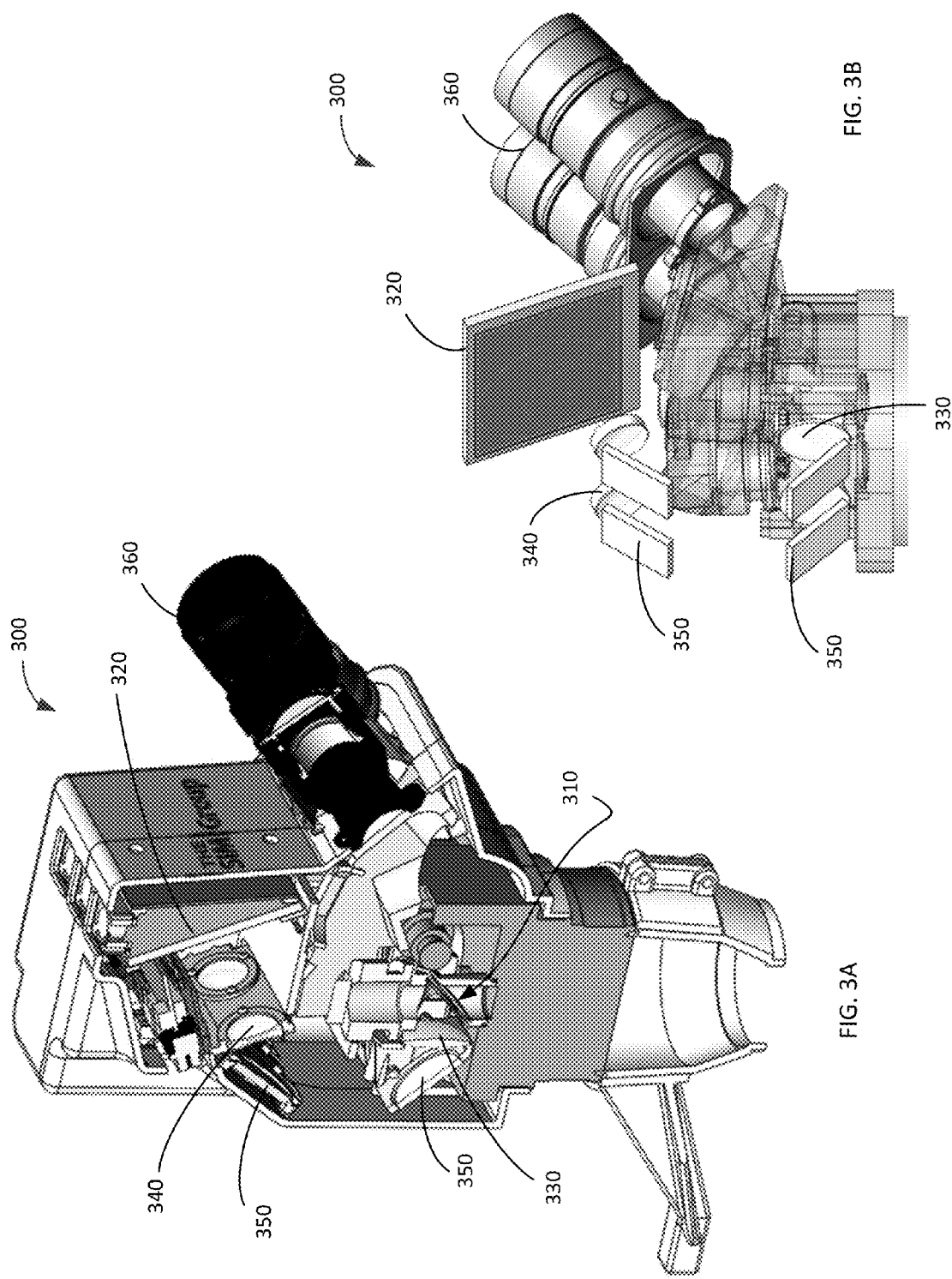

| Classification | Definition | Examples |
|---|---|---|
| First order data | Raw sensor data | • Instruments positions/orientations<br>• Instruments opening/closing<br>• Instruments force |
| Second order data | Data derived from raw sensor data | • Instruments tip positions<br>• Instrument velocity |
| Event | A crossing of a defined threshold for a given stream of sensor data or second order data | • Tip of needle holder enters a ROI.<br>• Forceps open<br>• Scissor cut |
| Gesture | A pattern of events | • Needle holder tip is closed.<br>• Forceps grasp with medium tension<br>• Needle holder pitches 95 degrees about its axis.<br>• Cut w/ scissors |
| Subtask | A pattern of gestures | • Pass Needle<br>• Two-throw knot tie<br>• One-throw knot tie |
| Task | A set of subtasks | • 2-1-1 knot placement<br>• Interrupted suture<br>• Running suture<br>• Exploration w/ forceps |
| Procedure | A set of tasks | • Full thickness eyelid laceration repair |

FIG. 6A

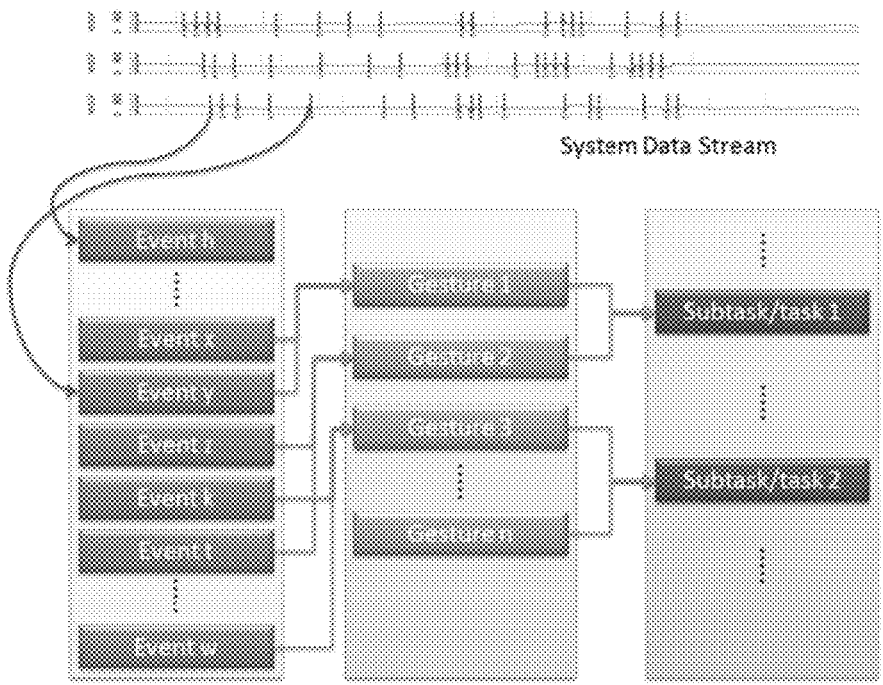

FIG. 6B

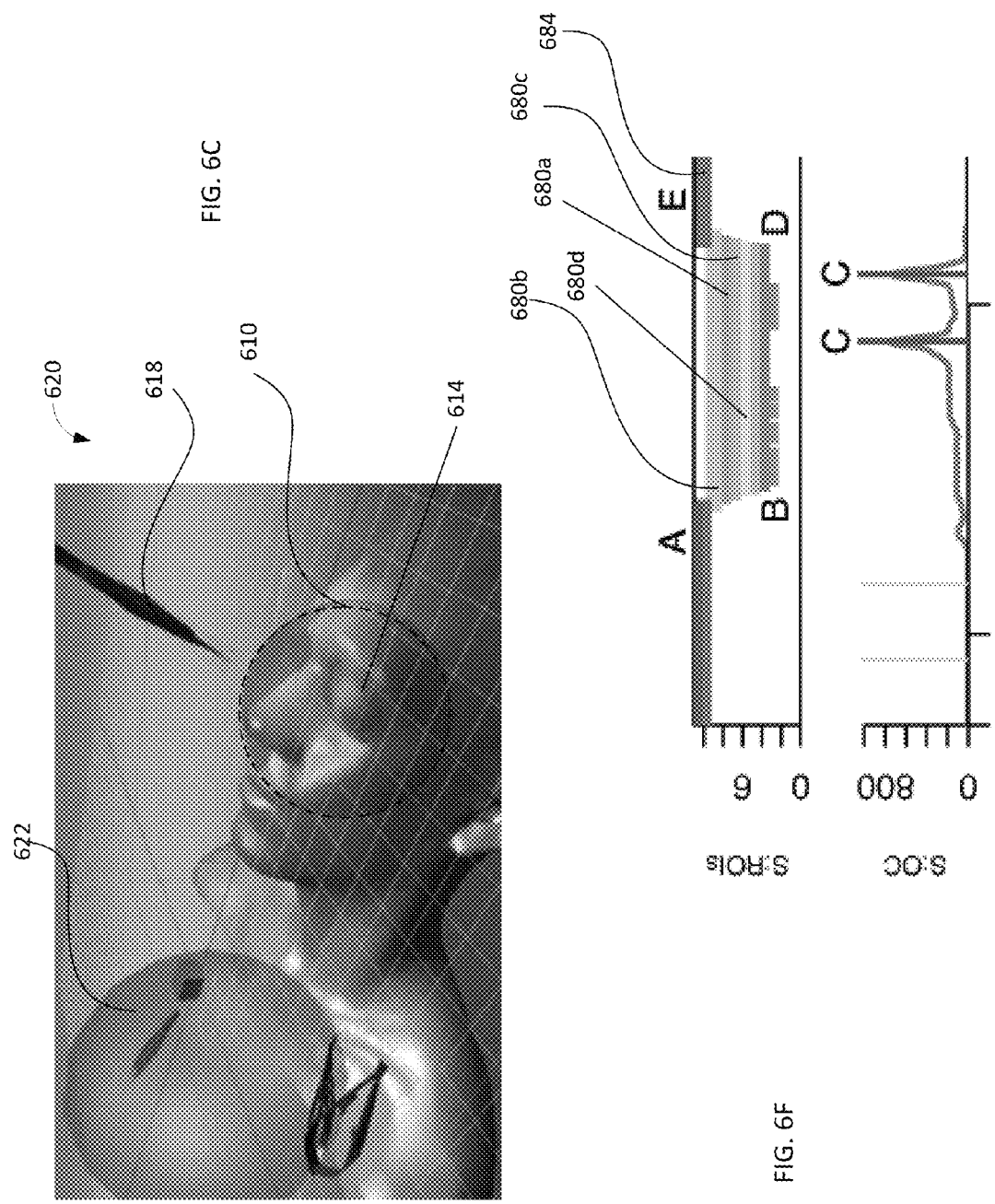

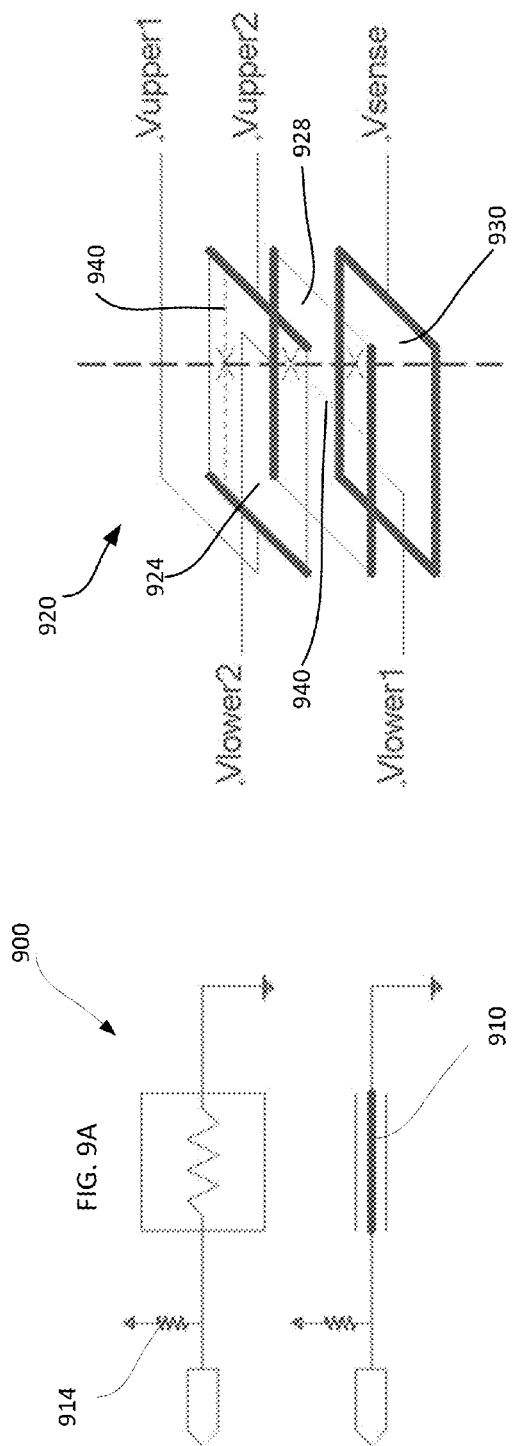

_US 9,595,208 B2_

TRAUMA TRAINING SIMULATOR WITH EVENT-BASED GESTURE DETECTION AND INSTRUMENT-MOTION TRACKING

CROSS-REFERENCE TO RELATED APPLICATIONS

This application claims the benefit of U.S. Provisional Patent Applications Nos. 61/860,397 filed Jul. 31, 2013 and titled "Training Simulator for Ocular Trauma and Other Injuries", and 61/861,179 filed on Aug. 1, 2013 and titled "Training Simulator for Ocular Trauma and Other Injuries". The disclosure of each of above-mentioned patent applications is hereby incorporated by reference herein, for all purposes.

STATEMENT REGARDING FEDERALLY SPONSORED RESEARCH OR DEVELOPMENT

This invention was made with government support under Grant Number W81XWH-11-C-0095 awarded by the U.S. Army Medical Research Acquisition Activity (USAMRAA). The U.S. government has certain rights in the invention.

TECHNICAL FIELD

The present invention relates generally to an injury training simulator configured to operate based on sequencing of surgical gestures of the user and, in particular, to a training simulator specifically developed to expose a physician to a variety of teaching scenarios related to eye trauma (such as eyelid lacerations and injuries to structures of the eye globe, including cornea and sclera.

BACKGROUND ART

Obtaining practical experience in medical training in the past has typically relied upon learning on animal models or on patients. The use of animals for such training is becoming unacceptable, expensive, and, from the point of view of application, has limitations due to anatomical differences from humans. Learning on patients is similarly unacceptable, as it places unnecessary risks on patients. Non-tissue-based simulators are being developed for numerous medical disciplines based on various technologies ranging from virtual reality and gaming to physical mannequins. One specific area that has been under-addressed, however, is training simulation for craniofacial and ocular traumas, which include injuries to the eye globe and surrounding tissues.

Physician training in eye trauma is increasingly concentrated in referral centers, resulting in fewer ophthalmologists with extensive trauma expertise. Conventional training of medics emphasizes saving a limb first, although loss of sight through delayed intervention can also result in permanent disability. Practical exposure of physicians to ocular trauma is becoming deemphasized in medical schools, (partly due to increase in the overall course load) and, as eye-trauma cases are more and more congregated to clinical environments in specialized "trauma centers" of regional clinical institutions (such as the Massachusetts Eye and Ear Infirmary, for example), opportunities available for physicians to learn first-hand become more and limited. Facial and neck trauma can be complex, and techniques such as application of tourniquet may be inappropriate; control of hemorrhage may conflict with maintenance of airway, as when packing the oral cavity to control bleeding.

There emerges a need in a flexible training trauma simulation system (and, in particular, in a simulator of ophthalmological trauma) that is readily re-adjustable depending on the immediate need and that does not depend on availability of clinical environment. A multi-purpose simulation, teaching and performance measurement system to provide exposure of realistic, dynamic scenarios of ocular and craniofacial trauma to physicians and medics is required.

SUMMARY

An embodiment of the invention provides an object training platform for use with a surgical training simulator system. Such platform includes a hosting structure structured to represent a portion of human anatomy. The platform further includes a replaceable trauma module containing i) a prosthetic anatomical structure containing a periorbital structure that includes an eye-lid and an eye globe in cooperation with a drive mechanism, and ii) an incision sensor disposed in cooperation with the periorbital structure. The drive-mechanism is structured configured to effectuate movements of the eye globe in pitch and yaw and proptosis, while the incision sensor is structured to detect incision of an instrument into the trauma module and, in response to such incision, generate data based on which electronic circuitry of the surgical training simulator system determines a path of said incision through the trauma module. The prosthetic anatomical structure may be additionally configured to enable a simulation of one or more of hemorrhagic chemosis and blinking of an eye. Alternatively or in addition, the replaceable trauma module includes a network of hollow channels disposed therethrough, said channels filled with fluid. For example, the platform may comprise, in fluid cooperation with the eye globe, a fluid reservoir, a pump, and a valve system structured to deliver fluid with viscosity and coloration similar to that of human aqueous humor into the eye globe at a rate typical for normal rate of generation of aqueous humor in a human (in a specific implementation, at a rate of about 2.4 microliters per minute). A platform may include electronic circuitry and a force sensor disposed in cooperation with the eye globe and drive mechanism and configured (i) to detect application of force against the eye globe, and (ii) in response to such force application, to generate data, based on which the electronic circuitry is configured to determine whether a predetermined operational threshold of change of operational status of the instrument has been crossed. Alternatively or in addition, the platform nay include a pressure sensor disposed in cooperation with the eye globe and fluid pump and valve system to detect fluid pressure within the eye globe and determine whether it is at, above or below normal intraocular pressure of approximately 15 mmHg and, in response to which generate data based on which electronic circuitry of the surgical training simulator system determine whether the eye globe is sealed or has an unsealed incision communicating between the inside and outside of the eye globe and generate an event corresponding with this state. The electronic circuitry of the surgical training simulator system may be further configured (i) to produce an output representing whether the eye globe is sealed or has an unsealed incision, said incision connecting spaces inside and outside of the eye globe and (ii) to generate an event corresponding with a state of the eye globe. A platform can include ear canals fluidly connected to the reservoir, pump and valve system such for delivery of simulated cerebrospinal fluid to the ear canals;

and/or a nasal cavity and nasal airway structures fluidly connected to the reservoir, pump and valve system for delivery at least one of simulated blood and simulated cerebrospinal fluid to the nasal cavity Embodiments of the invention additionally provide for a microscope system for use with a surgical training simulator system. The microscope system includes (i) a microscope system display; (ii) a beamsplitter positioned at a location defined by an intermediate image of an object in a field-of-view (FOV) of the microscope system; and (iii) an optical relay system providing optical communication between the microscope system display and the beamsplitter such as to form both an image of the object and an image of the microscope system display in the same image plane. In one implementation, the optical relay system may be configured such that the image of the microscope system display is formed by the microscope system with a coefficient of magnification less than one, while the image of the of the object is formed with a coefficient of magnification greater than one.

Embodiments of the invention additionally provide for a surgical training simulator system that includes a housing structure and an optical module affixed to the housing structure. The optical module contains (a) an optical camera positioned to capture images in light received from a workspace that includes a field-of-view (FOV) of the of the optical camera; (b) a lighting system structured to illuminate a workspace; and (c) an projector configured to form an image, of a display of the projector, in the workspace in light received from the display of the projector. The simulator system may additionally include tangible, non-transitory computer-readable storage medium having computer-readable program code thereon. The computer-readable program code includes as least program code for generating, with electronic circuitry of the surgical training simulator system and for each motion from a set of motions that have been tabulated for a surgical procedure performed with an instrument within the workspace, an event output representing an occurrence of re-alignment of the instrument when data, acquired with the electronic circuitry, indicate that a change in operational status of the instrument has crossed a predetermined operational threshold; and program code for creating a multi-level hierarchy of descriptors representing changes in the operational status of the instrument by determining identifiable portions of the motion based on combination of multiple event outputs.

The computer-readable program code may additionally include:

program code for determining a deviation of said multi-level hierarchy of descriptors from a reference hierarchy to generate a mismatch output representing whether the deviation is within a tabulated acceptable range; and program code for forming, based on the mismatch output, an optical image containing a diagram that represents analysis of changes in the operational status and displaying said optical image.

An embodiment of the simulator system may additionally include a microscope system disposed, in cooperation with the housing structure, such that a microscope system FOV covers at least a portion of the workspace. Such microscope system includes a microscope system display; a beamsplitter positioned at a location defined by an intermediate image, of an object under test, formed by the microscope system; and an optical relay system providing optical communication between the microscope system display and the beamsplitter. Alternatively or in addition, the microscope system is structured to form an image of the object under test at a first image plane and an image of the microscope system display at a second image plane, the first and second image planes coinciding. Alternatively or in addition, the optical relay system is configured such that an image of the microscope system display is formed by the microscope system with a coefficient of magnification less than one. Alternatively or in addition, the optical module includes a reflector disposed in cooperation with the housing structure to deliver image-forming light between the workspace and the optical camera and between the workspace and the display of the projector.

In a specific embodiment, an instrument of the simulator system includes a sensor configured to generate data representing a change in operational status of the instrument. Such data may include positional data acquired from a positional sensor of the instrument, the positional data representing a movement or values derived from the movement of a tip of the instrument across a boundary of a pre-defined spatial region of interest (ROI) defined within the workspace or opening/closing of the instrument across pre-defined thresholds. Alternatively or in addition, such data may include force data acquired from a force sensor of the instrument, the force data representing one or more of force applied to the instrument, or values derived from said force. An embodiment of the simulator system further includes an object of training in the workspace, the object of training having a structure representative of human anatomy and a trauma module replaceably attachable to the structure. The trauma module may contain an incision sensor configured to detect incision of an instrument into the trauma module and, in response to such incision, generate data based on which the electronic circuitry determines a path of incision through the trauma module. The incision sensor may be structured to include first and second layers, each of which has a corresponding conductive material disposed along two opposing edges of the corresponding layer. Alternatively, the incision sensor may be structured to include not only first such and second layers but also a third layer having a conductive material disposed around a perimeter thereof. The trauma module may include an artificial structure representing at least one of skin, tarsal plate, and conjunctiva, where such artificial structure has stiffness and mechanical strength the values of which represent at least one of natural skin, natural tarsal plate, and natural conjunctiva. Alternatively or in addition, the trauma module may include an artificial structure representing at least one of canaliculi and puncta of an eyelid arranged in structural communication with a nasal airway structure.

Embodiments of the invention additionally provide a method for motion analysis with a surgical training simulator system. The method includes (for each motion from a set of motions that have been tabulated for a surgical procedure performed with an instrument within a workspace defined around an object of surgical training by a field-of-view (FOV) of an optical system of the simulator system) the following steps at least one of which is performed with the use of electronic circuitry of the simulator system: a) generating an event output representing an occurrence of re-alignment of the instrument when data, acquired with a detection unit of the system indicate that a change in operational status of the instrument has crossed a predetermined operational threshold; b) creating a multi-level hierarchy of descriptors representing changes in the operational status of the instrument by determining identifiable portions of the motion based on combination of multiple event outputs; c) determining a deviation of said multi-level hierarchy of descriptors from a reference hierarchy to generate a mismatch output representing whether the deviation is within a tabulated acceptable range; and d) based on the mismatch output, displaying an optical image with a diagram representing analysis of changes in the operational status.

The step of generating may include generating an event output in response to positional data acquired from a positional sensor of the instrument, where the positional data represents a movement of a tip of the instrument across a boundary of a pre-defined spatial region of interest (ROI) defined within the workspace. Alternatively or in addition, the step of generating may include generating an event output in response to comparing the positional data with optical data acquired by an optical system of the simulator system and, additionally, include representing position of the instrument within the workspace. Alternatively or in addition, the step of generating may include generating an event output in response to force data acquired from a force sensor of the instrument, the force data representing one or more of force applied to the instrument and data derived from said force. The step of creating may include combining multiple event outputs to form a description of a gesture, the gesture being a portion of the tabulated motion. Alternatively or in addition, the step of creating may include combining multiple gestures to form a description of a set of sub-tasks, said description fully describing the motion. The process of combining, in a specific embodiment, includes discarding an event output when a description of a gesture formed corresponds to a gesture that is not identifiable by the simulator system. The method may further contain (i) a step of projecting an image of a display configured to generate said diagram onto the object of surgical training and/or a step of (ii) displaying a video-frame with an image of instrument in the workspace in spatial relation to the object of surgical training.

In a specific embodiment of the method may further comprise acquiring data from an incision sensor disposed in an object of training of the simulator system, where the incision sensor includes a layered structure with first and second layers, each of the first and second layers having stripes of conductive material disposed along two opposing edges thereof. Such data acquisition may include acquiring data from an incision sensor configured to detect incision of an instrument into a trauma module of the object of training. The embodiment may further comprise a process of generating data, in response to the detected incision, based on which the electronic circuitry determines a path of incision through the trauma module.

BRIEF DESCRIPTION OF THE DRAWINGS

The invention will be more fully understood by referring to the following Detailed Description of Specific Embodiments in conjunction with the Drawings, of which:

FIG. 1A is a diagram illustrating schematically an embodiment of a training simulator of the invention;

FIG. 1B is a diagram illustrating schematically an augmented reality microscope system of the invention that can be used to complement an embodiment of FIG. 1A;

FIG. 3A presents a cut-out perspective view of an embodiment of the microscope for use with the training simulator, which embodiment is augmented according to the idea of the present invention;

FIG. 3B presents a different view of the embodiment of FIG. 3A;

FIGS. 6A and 6B diagrammatically illustrate hierarchy of recognition/detection indexing used in the gesture-recognition algorithms of the invention;

FIG. 6C illustrates a user interface screen of the projector of the system showing a particular region of interest at point during a given procedure and relative position of the instrument;

FIG. 6F is a diagram illustrating practical taxonomy of a sub-task of a hierarchy according to an embodiment of the invention;

FIGS. 9A, 9B, 9C, 9D provide simplified schematics illustrating embodiments of incision-detection sensors of the invention;

DETAILED DESCRIPTION

Figure 2A:
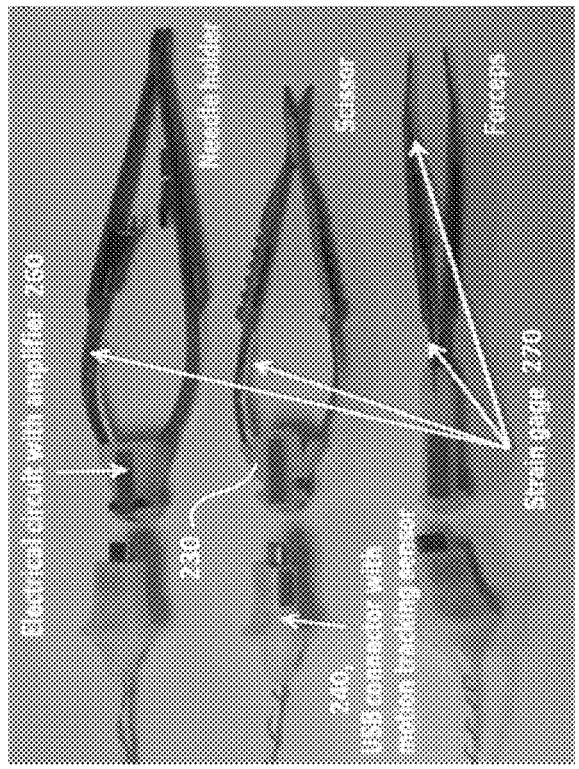
FIG. 2A is a diagram illustrating embodiments of instruments for use with and equipped with circuitry for auto-identification by the simulator system of the invention.

In accordance with preferred embodiments of the present invention, methods and apparatus are disclosed for a physical injury simulator employing a specifically-structured mannequin comprising a judiciously chosen series of physical components and operable in reliance on surgical gesture detection and the detection-response software, which performs quantitative measurement of the physical actions of a trainee and real-time feedback provided by a virtual reality-based sub-system of the apparatus.

Embodiments include an eye trauma simulator that employs a physical model of a head with replaceable trauma modules (interchangeably referred to as "portals"), a suite of surgical instruments with interchangeably-attachable position-tracking sensors that are configured to be operably cooperated with the user's (trainee's) fingers, hand-motion sensors configured to assess hand motions not associated with instrument motions, and a computer-processor specifically programmed to generate an output representing statistical score and/or assessment of performance of the user based on event-driven approach—as opposed to the motion-tracking approach that is typically used in surgical simulators to-date. A simulator structured according to embodiment of the invention includes performance scoring algorithms, enables surgical task/sequence detection, identifies differences in operational performance of a novice vs. an expert and provides feedback contemporaneously with a simulated surgical procedure effectuated at the simulator (optionally, in reference to expert knowledge/curriculum). In one implementation, feedback output created by the simulator represents a performance assessment ranking compared to that for an average expert for a given procedure.

The goals of using a simulator of the invention such as the simulator 100 include: provide a stand-alone training facility for multiple trauma scenarios (such as retrobulbar hemorrhage, periorbital and facial hemorrhage, compromised airway, and facial fractures; eye trauma scenarios: lid laceration, globe laceration); to collect user hand/instrument motion trajectories for development of scoring/guidance tools; to provide augmented-reality didactic content presentation, feedback generation and an evaluation system using projection directly on a mannequin, modified surgical loupes and through a microscope and open-format data and scenario structures; to integrate eye/face trauma system into trauma mannequin system for expanded scenario capabilities.

Embodiment of a Training Simulator.

A schematic diagram illustrating an embodiment 100 of the simulator is shown in FIG. 1A, and includes an optical module 110 (containing, for example, a lighting system 114, web-cam 118, a 3D-camera (Kinect) 122 and a reflector 124 facilitating compact mounting of the 3D camera). The module 110 is mounted on a housing/framing structure 130 that also supports a video projector 134 and an instrument/suture rack 138 the instruments 138A of which are operably connected with electronic circuitry unit including a data acquisition system (DAQ) and data-processing board, a position/orientation tracking system (such as, for example, Ascension Technologies trakSTAR magnetic field emitter with six-degree of freedom (DOF) sensors, or Polhemus Liberty system), and ID/Gage amplification board(s)). The electronic circuitry for the DAQ and for the trakSTAR system is not shown.

Figure 1C:
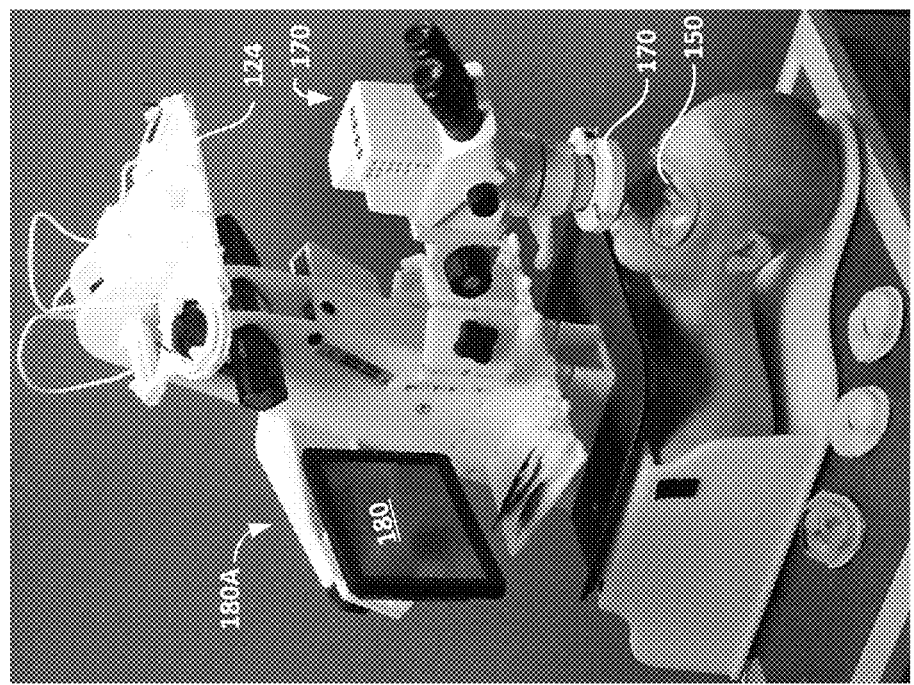
FIG. 1C is an image of the embodiment of the simulator complemented with the augmented reality microscope system prepared for training of a user and a modular touch-screen display.

The module 110 has a field-of-view (FOV) defining a workspace about a predetermined location (at which the object of training is placed in operation, as discussed below) at the basis of the framing structure 130. The reflector 124 is positioned at a first height-level between the lighting system 114 and the predetermined location and oriented so that, when both the Kinect camera 122 and the projector 132 are mounted to the structure 130 at a respectively-corresponding height-levels between the lighting system 114 and the predetermined location, a) light delivered to the camera 122 from the workspace by the reflector 124 is accepted by the FOV of the camera and b) an image projected from the projector 134 by the reflector 124 is delivered to the workspace. Unit 142 denotes a magnetic field emitter for the position tracking system operably cooperated with a programmable computer processor (not shown) and an input module (not shown) such as a manual keypad. In operation, an object of training 150 (such as, for example, a mannequin head) is appropriately positioned with respect to the physical framing structure 130. To facilitate the visualization of the object of training, an embodiment of the system a portion of which is shown as 100' in FIG. 1B may be equipped with a microscope system 160 that has been specifically restructured, as discussed below, to deliver to a trainee a combined image resulting from an overlap between an image of the object of training at hand and a display of instructions and/or feedback provided by the system. FIG. 1C is an image of the embodiment in cooperation with one of the objects of training 150. FIG. 1C also illustrates a touch-screen monitor 180 structured to provide teaching content and feedback and a user interface to the trainee. The monitor 180 is attached to the framing structure 130 through a repositionable mounting arm 180A.

Framing Structure.

The framing structure 130 were configured to minimize the use of metallic components which may distort the magnetic field used by the instrument position tracking system, and is separable into substructures each of which is dimensioned to be can be packed into a case acceptable as checked luggage for transportation for off-site training and demo exercises. The structure 130 can include interlocking t-bolt construction for ease of part fabrication (laser-cut flat acrylic panels), assembly and replacement of components.

Tracking System.

The magnetic field emitter 142 of one embodiment of the position tracking system was rigidly mounted into the framing structure 130 at a known position relative to the object of training 150 such that the most sensitive region of the position tracking system occupied the space where the instruments (discussed below in reference to FIGS. 2A and 2B), were typically be located while performing surgical gestures on the simulated anatomy of the object of training 150. The 6-DOF (degree of freedom) sensors, configured to measure the position and orientation of a given instrument with respect to the object of training (such as a mannequin head, discussed elsewhere in this disclosure), were mounted into interchangeable sensor holders that mate with connectors mounted to each of a series of surgical instruments 138A. (As the magnetic tracking sensors are expensive and are tethered to their interface electronics, so to minimize cost and the number of cables that the surgeon must contend with, a set of interchangeable connectors were developed that provide operable communication between the instruments and DAQ/interface board, which also held and aligned the tracking sensor with the instruments.) The mating sensor holders were designed with a directional features that permit mating only in the correct orientation for integrated microUSB connectors, and which automatically align the sensor holder and connector during insertion through the use of mating helical surfaces. This prevented the user from incorrectly attempting to connect the sensor holder to the instrument. In a related embodiment, a different tracking system (such as an optical tracking system or an inertial tracking system) can be used.

Instrument Rack and Instruments.

A set of instruments and supplies with which the embodiment of the simulator 100 was equipped included, in one embodiment, instruments appropriate for repair of eyelid laceration, repair of laceration of eyelid and canaliculi, treatment of retrobulbar hemorrhage through performance of lateral canthotomy and cantholysis, and repair of corneoscleral lacerations such as, for example, D&K Vannas scissors (Ambler Surgical item #1-110)
D&K Westcott stitch scissors (Ambler Surgical item #1-500)
D&K Westcott tenotomy scissors (Ambler Surgical item #1-510)
Castroviejo suturing forceps, 0.12 mm jaws (Ambler Surgical item #2252T)
Castroviejo suturing forceps, 0.3 mm jaws (Ambler Surgical item #2253T)
Castroviejo suturing forceps, 0.5 mm jaws (Ambler Surgical item #2255T)
Kelman-McPherson tying forceps (Ambler Surgical item #2442T)
McPherson tying forceps (Ambler Surgical item #2446T)
Barraquer needle holder (Ambler Surgical item #OH021U)
Castroviejo needle holder, curved jaws (Ambler Surgical item #4536T)
Castroviejo needle holder, straight jaws (Ambler Surgical item #4460T)
D&K lacrimal dilator (Ambler Surgical item #6-180)
D&K Barraquer lid speculum (Ambler Surgical item #9-551)
Surgical eye spears (sponge) (Owens and Minor item#603430D049)
Surgical gauze The image of FIG. 2A shows surgical instruments 138A including an adaptor 230 and tracking sensor plug 240 in one embodiment. The adaptors and plugs are structured with electrical connectors (such as, for example, a microUSB) to carry power and signals between the adaptor (and instrument) and the plug (and data acquisition system). This connector also provides for mechanical retention of the plug into its mating socket in the adaptor. The plug 240 is removable from the adaptor 230. As, in the surgeon is likely to be holding no more than 3 or 4 instruments at any given time during the practical training, the plugs are configured to be swappable from unused instruments to those currently in use to reduces the likelihood of tangling of cables while the trainee is performing the surgical task.

Figure 2B:
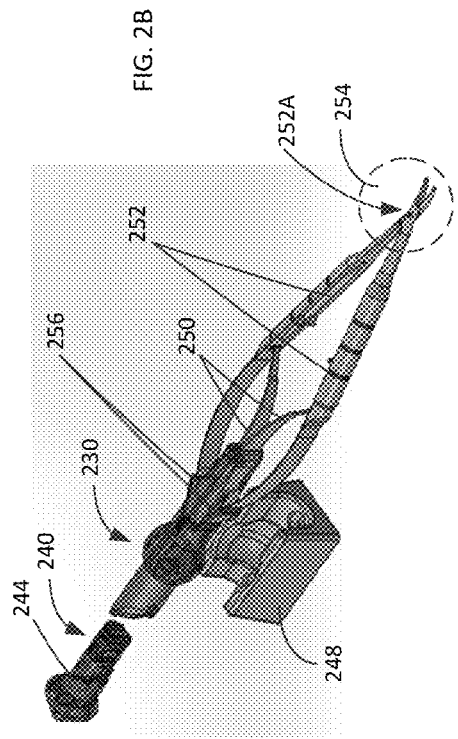
FIG. 2B is a view of an embodiment of a gauged instrument of the invention.

In reference to FIG. 2B, showing a related embodiment, the mechanical design of the adaptor/plug combination 230/240 included features that allowed the connector to fit together in only one orientation, thereby avoiding a potential damage to the mechanical structure of the connector and the electrical circuit board. In one implementation, the plug 240 was primarily cylindrical, however two exterior elements (helical ramp structures) 244 were provided so that one or the other contacts corresponding helical ramp features on the adaptor when the plug was inserted. These helical ramps caused the plug 240 and the adaptor 230 to rotate with respect to each other during the process of mating for proper alignment of the microUSB connector components and reliable mechanical retention connection. Such rotary motion formed a torque generated by the ramp features while the user provided force to insert the plug into the adaptor, which torque provides guidance to the user to allow the rotation in the correct direction to allow the connection to be made.

Generally, the mechanical structure of the adaptor 230 also included cylindrical and spherical elements that have radial symmetry. These features allowed the adaptor 230 (with the attached instrument 138A) to be placed into a mating holder 248 that was mounted to the instrument tray 138 element of the system 100. The radially-symmetric features allowed the adaptor/instrument or adaptor/instrument/plug combinations to be easily placed into the holder in any orientation with the tip of the instrument pointed away from the user. This kept sharp ends of the instruments away from the user when stored on the tray. In an implementation where the cylindrical features are present, they have different diameters, with corresponding differences in the widths of the mating sections of the holder, so that the adaptor only fits into the holder in the tips-away-from-user configuration. The adaptor 230 was structured to not fit into the holder in the tips-towards-user configuration. The cylindrical/spherical design of the adaptor allowed the adaptor to spin around its axis when the user inserts the plug into an adaptor which rests in the holder. The holder design also allowed the user to pull the plug out of the adaptor when the adaptor rests in the holder. This holder-mounted insertion and removal of the plug can be performed one-handedly, empowering the user to perform this task without putting down an instrument in the other hand. One skilled in the field is able to devise alternate means of generating these features.

As shown in FIG. 2B, some instruments 138A (such as a needle holder and scissor instruments) employed leaf springs (flexural beams) 250 juxtaposed against the pivoting arms 252 that intersected at a pivot point 252A to provide restoring force to reopen the jaws 254 of the instrument 138A. For the scissors and needle holders of this design, the pivoting arms 252 were slightly separated from each other, the ends of the arms were mounted into form-fitting housings 256 that in turn have pivots in the main body of the adaptor. Because of the flexibility of the arms 252 and the multiple pivots, scissors and needle holders of this design may rotate with respect to the adaptor 230, so the jaws move away from the axis of the adaptor. For accuracy of calculating the location of the tips of the instrument relative to the position tracker, flexural beams 250 mounted rigidly to the adaptor provided a restoring force to align the instrument jaws with the adaptor. These flexural beams are not required for forceps instruments, which do not have the pivots of the needle holder/scissor instruments.

In further reference to FIG. 2A, Surgical instruments 138A configured on the bases of known instruments (such as needle holder/scissors/forceps, for example) that have been additionally restructured to include strain gages 270 (as shown in FIG. 2A) specifically configured to measure the degree of a given instrument closure and to measure force applied to the instrument during grasping or cutting of the target tissue. Standard foil strain gages (Vishay Precision, CEA-06-062UW-350) were used in one implementation the closure measurement, and either foil gages (Vishay Precision, EA-06-070LC-350) or silicon strain gages (Micron SS-095-060-350PU) were used to measure strain due to applied force between instrument jaws.

In an embodiment of the simulator system that employs a magnetic tracking system to measure instrument location and orientation, all of these instruments are made non-ferrous (for example, except for the eye spears, all instruments can be made from titanium; the eye spears are wood or plastic and sponge). If an alternate, non-magnetic tracking system is employed instead, the requirement for non-ferrous materials may not be relevant, so standard surgical steel, or other materials, can be used as substitutes for the materials used in the instruments listed above.

The output signals received from instrument-specific gages of different instruments formed inputs to and were amplified with the use of a dedicated amplifier 260 (miniature circuit board, actual size 10 mm×16 mm), as required, and form instrument-specific output signals facilitating instrument identification by the data acquisition board. To convert the amplified gage output signals into useful data for our system, a circuit board was developed with a microcontroller (Microchip PIC18F2450) and electrical components that were attached to each instrument. The microcontroller supported USB communication and had a 10-bit analog to digital converter with 10 different inputs. The board communicated with the PC using the USB bus. For each instrument, there were three analog output signals: one is the tool identification signal; the other two were representing the opening and force states of the tool.

Figure 2C:
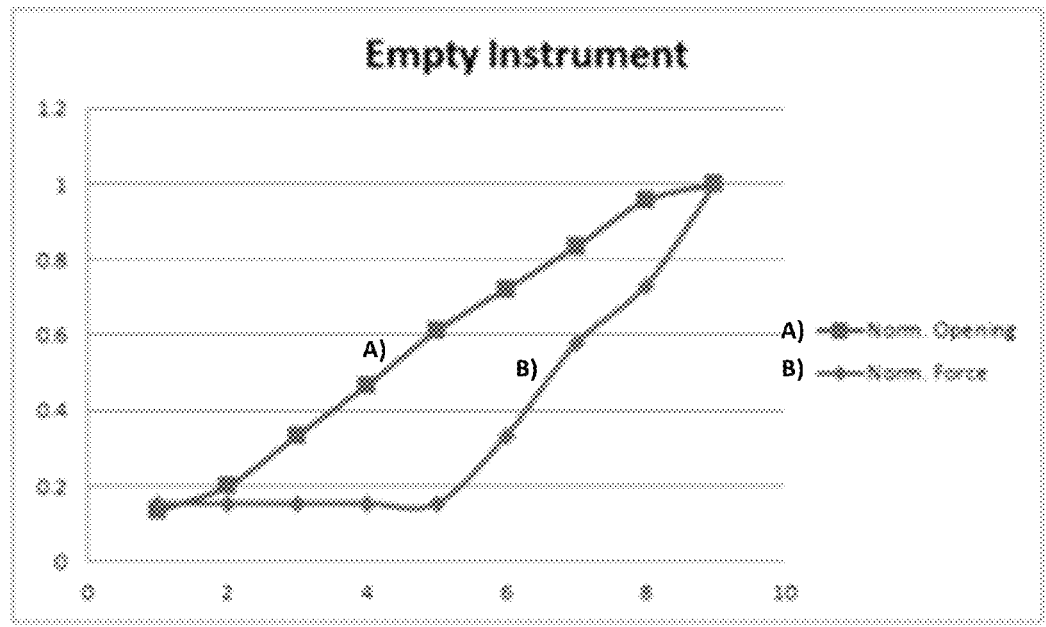
FIG. 2C is a plot representing empirically determined change in opening between the jaws of an empty instrument of the embodiment and force applied between the jaws.
Figure 2D:
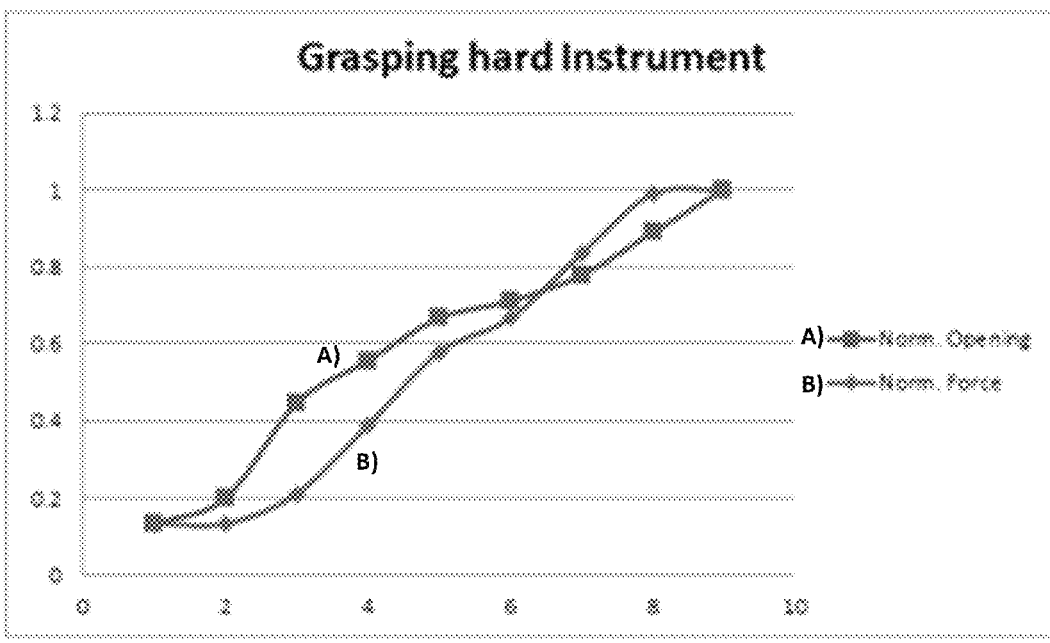
FIG. 2D is a plot representing empirically determined change in opening between the jaws of grasping hard instrument of the embodiment and force applied between the jaws.
Figure 2E:
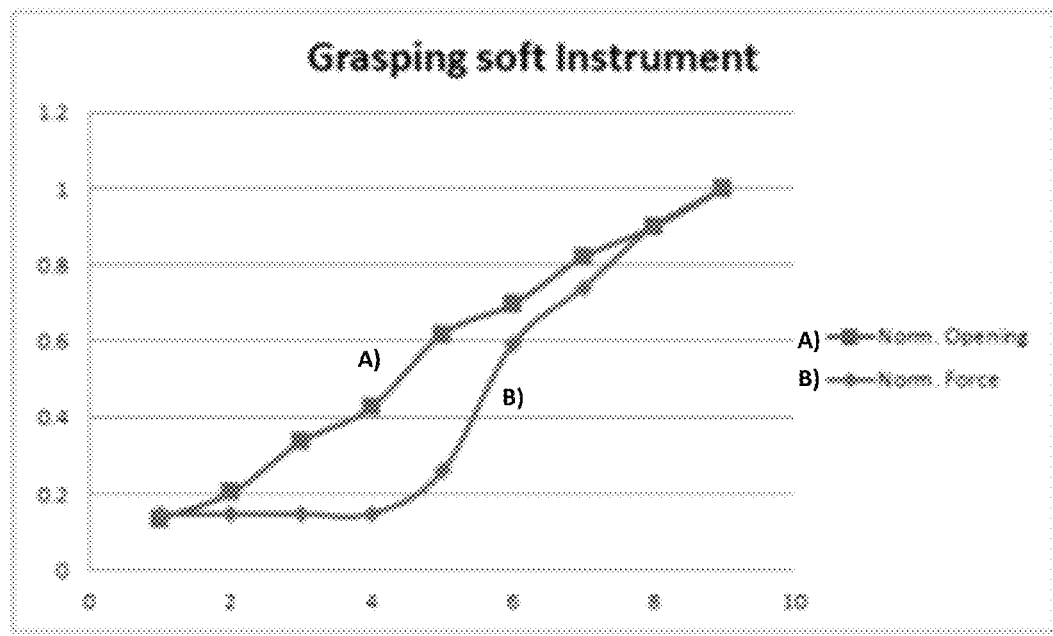
FIG. 2E is a plot representing empirically determined change in opening between the jaws of a grasping softly instrument of the embodiment and force applied between the jaws.
Figure 2F:
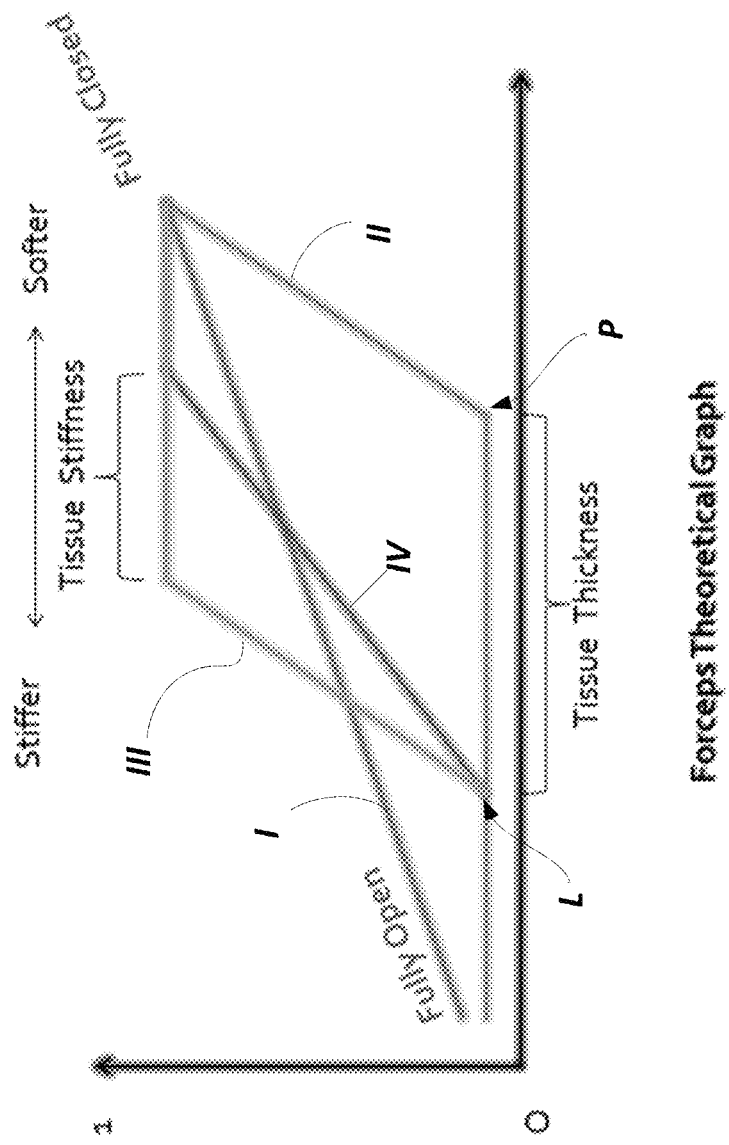
FIG. 2F is a theoretical plot corresponding to plots of FIGS. 2C, 2D, 2E.

Examples of instrument-specific empirical signals received from instruments are shown in FIGS. 2C, 2D, 2E in the form of plots of normalized force applied to the instrument and the normalized opening (degree of closure) of a given instrument. By combining the data received from the instrument gages the stiffness of the tissue can be assessed. A corresponding theoretical plot representing the operation of forceps is shown in FIG. 2F. Here, for the two strain gauges affixed to the instrument (one on the back for measuring the opening/closing of the instrument's jaws, and another on the tip, for measuring the tip deformation when a force is applied), and assuming the slow process of closing the forceps' jaws, Curve I (theoretically, a straight line) indicates the measure obtained by the opening; curve II shows the operation of the second gauge, which does not produce any signal until point P (where the two tips of the jaws touch each other), afterwards generating a linear signal with a higher slope. If there is an object between the two tips of the jaws, the signal corresponding to "touching" will occur other earlier (point L signifies another linear ramp of curve III). Based on the measurement of the force corresponding to the beginning of the linear ramp of the curve, it is possible to estimate the thickness of the object between the two tips. If the object between the two tips is a material the mechanical properties of which (for example, stiffness) are comparable with those of the jaws of the instrument, linear ramp (curve III) will have substantially the same slope as that of curve II. If the object between the two tips is softer then the material of the jaws, then the linear ramp has a smaller slope (as in the example of curve IV), providing data for assessment of the stiffness of the object.

Optical Module.

In further reference to FIG. 1A, a combination of the 3D camera 122, a video projector 134, web-cam 118, and lighting system 114 provide illumination of the scene to facilitate optical tracking of the user's hand motions and recording of these motions for data analysis, display of required visual content directly on the object of training 150 (such as a face of the mannequin, in one embodiment); and viewing of the surgical field. The lighting system 114 was selected such that the color temperature of light used for illumination of the surgical field is similar to that used in standard surgical lighting systems. The lights selected were chosen to have a color temperature similar to that of surgical light sources to improve realism of the simulator experience; typical household and commercial lights have color temperatures approximately between 2000 K and 3600 K, while surgical lights are generally in the 4000 K range to support improved visualization of tissues. The sources of light employed in one implementation were modified versions of an LED White Puck Lighting Kit (Hampton Bay, Model #21343KIT) connected in parallel and, together, to one of the output connectors of a daughter board (referred to above as "light board") of the microcontroller board discussed above. The lights were mounted in gimbals to allow for adjustment of the direction in which they point. The lighting system's on/off and brightness states were controlled with the use of a programmable processor (a laptop, for example) and a circuit board (microcontroller board, discussed above) that generated PWM output, both of which complement the embodiments of the simulator 100, 100'. The capability to increase the brightness of illumination facilitated viewing of the surgical field; dimming of light allowed for easier visualization of images projected onto the object of training 150. (Such image projection may be used as a proxy for the physical presence of an expert directly observing the performance of a trainee. The expert would point at relevant anatomy or demonstrate techniques for suture or knot tying, for example. In absence of the expert, the relevant training images such as graphical arrows, texts, video clips can be projected onto the object of training 150 by the projector 134.) Turning off the lighting was used as a cue for the trainee to observe content on the display of the programmable processor (the laptop or other external screen). The Kinect 3D camera's IR (infrared) emitter and camera system 122 and the video projector 134 had fields of view that required placement of each component at a minimum distance away from the object of training 150. To project/observe the object 150, the Kinect and projector need to be positioned high above the training object, resulting in a system that is undesirably tall. To alleviate this condition and to make the system more compact, a reflector may be positioned over the training object and oriented such that the Kinect and projector are accommodated within the limits of the frame 130 at a certain height between the illumination system and the object of training. The Kinect acquires optical data representing the light reflected by the trainee's hands and the projector imagery is projected with the use of the mirror onto the object of training Augmented Reality Microscope System.

When performing eye surgery, magnification through the use of a binocular microscope is necessary to properly visualize the anatomy. In developing a simulation-based training system for eye and face trauma, one of the elements necessary to include is an analog to the operative surgical microscope, to provide as much as possible, a realistic interface to the user. For a medical simulator that includes graphical feedback to the user either to present virtual anatomy or includes visual feedback and instruction (augmented reality), it is desirable that the microscope include the capability to present such information through its own optics, so that the trainee can maintain a "heads-down" position to receive feedback, rather than breaking view of the anatomy to look at an external video display.

Figure 3C:
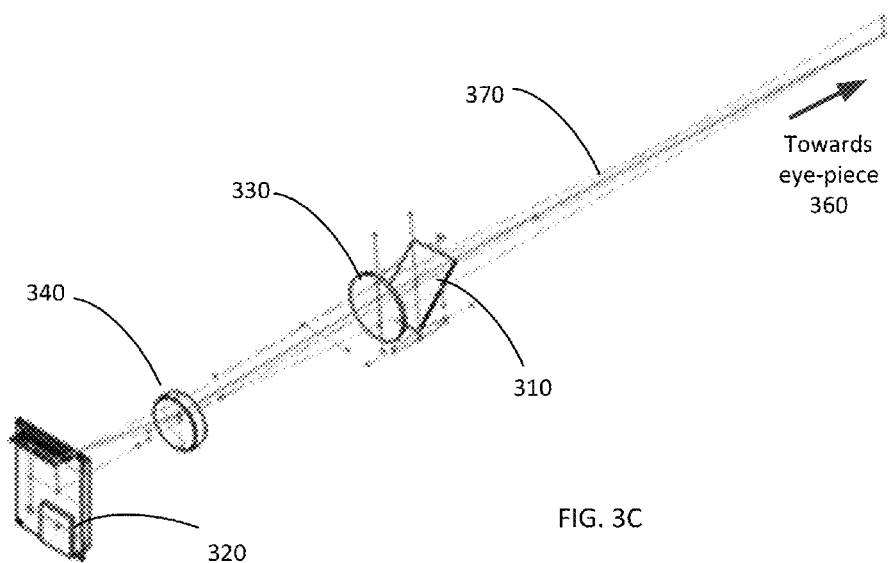
FIG. 3C shows an unfolded optical path of an embodiment of an augmented reality microscope for rays propagating from the display of the embodiment towards the eyepiece(s)

An embodiment of the microscopic system 300 of the invention (portions and optical path of which are illustrated schematically in FIGS. 3A, 3B, 3C) includes a binocular surgical microscope judiciously augmented with additional optics and a graphical display module that, aggregately, form an integrated view of simulated physical anatomy of the object of training with graphical imagery and teaching content in the same binocular view.

Specifically, an optical system of an Amscope ZM245NT (Irvine, Calif.) trinocular microscope was modified by disposing beam splitters 310 at a an appropriate position as to relay light from a display (LCD) 320 of the microscope system 300 through additional lenses (convex 330, concave 340) and reflectors/prisms 350 towards respectively corresponding eyepieces and to overlap the optical path of such light with the optical path of light emanating from the object-under-the-test. (The original Amscope ZM245NT is equipped with an output channel for video/still image recording from the right-eye optical path, when an internal mirror is shifted into a position that also obstructs the right-eye optical path from reaching the viewer's right eye. It is not designed to allow projection of images into the view provided to the viewer.) The holders of the beam splitters 310 were equipped with a rotational adjustment mechanism so that the splitters can be adjusted to align the real object optical path (which passes through the splitter) with the path of the graphical images (which is reflected by the splitter into the same path as the real object optical path).

As a result of modifications, the microscope was reconfigured to collect distributions of light emanating from the object of training and from the LCD panel 320 (such as Purdy AND-TFT-35VX-UHB-LED, ultra-high brightness backlit VGA display module with a resolution of 640×480 pixels) and to propagate these light distributions substantially collinearly towards the eyepieces 360 to overlap images of the object of training and of the object(s) displayed at LCD 320 at the retina of the user looking through the eyepieces of the microscope; to form an optical fusion of two images. The augmented reality microscope is structured, therefore, to form an image the object under test at a first image plane and an image of the microscope system display at a second image plane, the first and second image planes coinciding with one another. In other words—and in stark contradistinction with existing simulator systems of related art—the augmented reality microscope system of the invention is structured to produce a stereoscopic view of the generated graphics, and to optically fuse the object image and the system display image thereby allowing for the illusion of three dimensional objects projected into the same field as the image of the real objects. (When using a system of related art, a view of the object through a video camera (or cameras) is digitally combined with the graphical elements, and the combined image is exclusively displayed on the system display.)

Binocular graphical overlays such as that realized in the embodiment 300 are necessary to create 3D representations for overlays built into the microscope view to reduce the need for the trainee to look up from the scope to view training content on a separate display.

With respect to imaging of features displayed at the LCD 320, a combination of concave and convex lenses 340, 330 for each eye path was designed not to magnify (as would be normally the goal of a microscope optical system and in contradistinction with a typical microscope system) but, to the contrary, to de-magnify such features to present to the user not magnified individual pixels of the LCD 320 but the full image from the display module contained in a single field-of-view. At the same time, the imaging of the object under test may be performed with a coefficient of magnification exceeding one, which may be variable using zoom optics of the microscope.

Reflectors 350 (such as Edmund Optics 4-6 Wave Mirror 20 mm×28 mm Enhanced Aluminum, Stock No. NT43-873) serve multiple purposes. First, they "fold" the full optical path length from the LCD panel to the beam splitter into a more compact volume. Second, the distance between the centers of the images displayed on the LCD (which was defined by the physical size of the LCD) and the distance between the mid points of the beam splitters (which are constrained to coincide with the optical path between zoom assembly and prism assembly) are different; the reflectors are used to reflect the image path such that the image center when it meets the beam splitter is aligned with the center of the beam splitter, reducing the distance between left and right eye image centers. Third, the microscope original optical paths are angled with respect to each other by about 10 degrees. Therefore, to align images displayed on the LCD with the real object images, either the images generated on the LCD must be rotated by 5 degrees in opposite directions (left image on screen by 5 degrees clockwise, right image on screen by 5 degrees counter clockwise), or the mirrors must be positioned so that they create the equivalent rotations. It was empirically determined that the best images were obtained when the reflectors were used to create the rotation, as this allows horizontal rows of pixels in each of the left and right eye images to remain horizontal, rather than requiring that apparently horizontal lines be generated as diagonal lines that show pixilation.

FIG. 3C schematically illustrates an unfolded optical path of rays 370 from the LCD 320 towards the eyepiece(s) 360.

In structuring the augmented microscope system 300, in order to maximize the brightness of the image from the LCD and given a limited LCD backlight output and geometrical constraints, the solid angle subtended by the LSD screen as seen from the concave lens 340 was maximized, thereby essentially minimizing the distance between these components. To move the microscope over the surface of the head (e.g. to view the upper vs. the lower eyelid), a 6-bar, closed loop mechanism shown in FIG. 1B is provided, which has mechanical friction brakes to lock the mechanism in place or release the friction to allow motion. In one implementation, the microscope motion is tracked using an Ascension Technology (Milton, Vt.) model 800 position sensor, allowing registration between graphical cues and physical simulator anatomy.

In addition to the microscope/graphical optics, and in further reference to FIG. 1C, a ring-light shown as 170 may be juxtaposed to the augmented reality microscope of the invention. The power supply for the ring light, LCD module and LCD back-light have been combined so that a single power supply (instead of three separate ones) can be used, using a small circuit that was designed making use of a DC-DC converter chip. The intensity of the ring-light 170 is made variable to control degrees of contrast between the real anatomical view (the image of the object of training 150) and graphical cues (the image of display LCD 320) with virtual reality capability when the field is dark. The ring light 170 had a dial control for light brightness, however the OCF system can control the brightness programmatically through the use of the "light board" data acquisition system (described elsewhere) using pulse width modulated control of the light board output. Controlling the light irradiance programmatically allows the system to change the relative brightness of the operative field or the augmented reality displays, as most appropriate for a given phase of a training scenario. In case of such programmable control, a PWM (pulse-width modulation) controller may replace the existing DC-DC converter circuit. Modifying the brightness of the ring light source can be used to dim the view of the object of training 150 so that graphical elements (e.g. instructions, video content, images) projected from the LCD 320 can be easily seen through the microscope, or brightened for proper viewing of the physical elements under the microscope head.

To complement the physical components of the microscope 300, program code(s) to generate stereoscopic views of virtual objects and adjust the stereo images for use in the microscope were created. The software also performed the comparison between microscope measured position and the location of the real objects to adjust the graphical view to maintain alignment between images of real object (such as an object of training 150) and graphical images of virtual objects (such as information displayed at LCD 320). Software renders two 3D separate views on the LCD, providing an adjustable degree of separation and creating a full stereo image integrated into the real view.

In operation, the zoom of the augmented microscope system 300 is detected using a potentiometer and the specifically programmed processor scales the graphical images to match in dimensions the images of real object using a control panel and calibration software. In one implementation, the microscope motion is tracked using an Ascension Technology (Milton, Vt.) model 800 position sensor, allowing registration between graphical cues and physical simulator anatomy.

Object of Training.

For teaching first responders and non-specialist surgeons the basics of responding to eye trauma, a simulation system (referred to as an object of training) is used, one embodiment of which has realistic anatomy and motion capabilities for the eye and periorbital structures. The system presents realistic looking synthetic eyes which can move in pitch and yaw, can exhibit proptosis (forward protrusion of the eye), blinking, hemorrhagic chemosis (bleeding underneath the conjunctiva), detect whether lateral canthotomy and cantholysis (cutting the outer tendon that holds the lower eyelid to relieve retrobulbar hemorrhage) has been performed, and whether pressure/force has been applied to the eye globe.

In addition, the object of training platform includes replaceable, disposable trauma modules for damage to the eyelid and ocular adnexa (tissues near the eye globe) and replaceable, disposable trauma modules for the eye globe. These modules are structured to seat into mating sockets on a representation of the head of a trauma patient. One version of the disposable trauma module for damage to the eye is made up of three major subsystems: drive mechanism, replaceable globe module and replaceable eyelid/external tissue module. A second version of the disposable trauma module for damage to the eye is made up of two major subsystems: the drive mechanism and a replaceable module which combines a full or partial face and both eye globe modules.

Figure 4B:
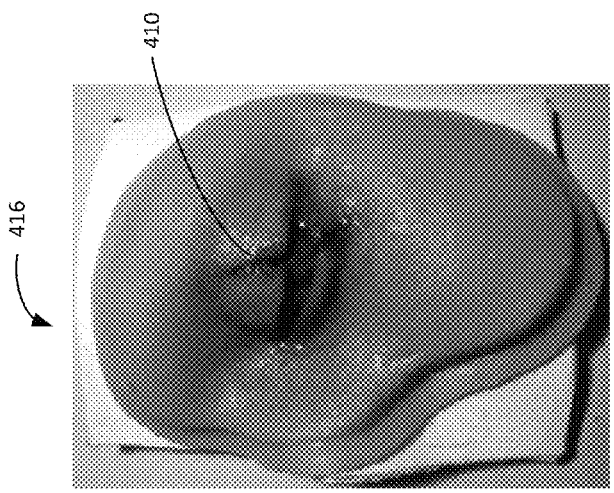
FIG. 4B is a magnified view of a replaceable module for the object of training, for use in training of eye-ball and/or lid lacerations.
Figure 4A:
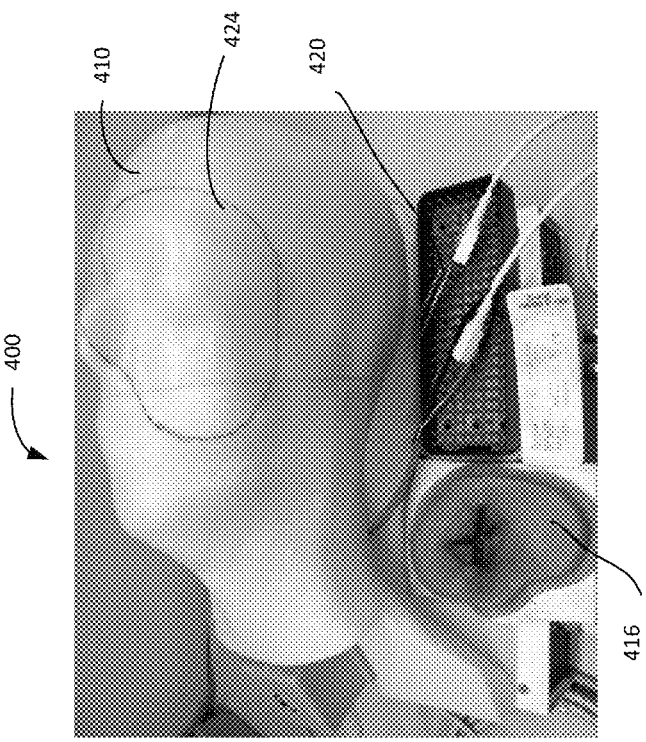
FIG. 4A shows an object of training with a replaceable module for use with an embodiment of the simulator.
Figure 4F:
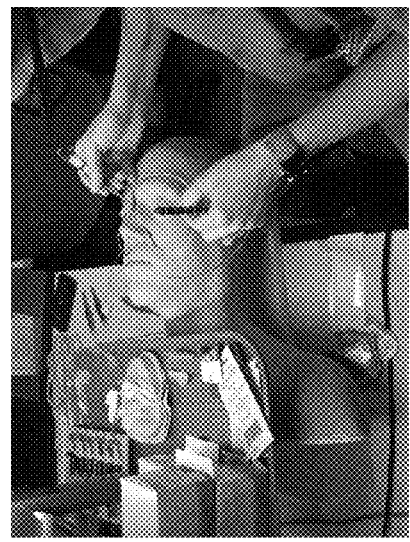
FIG. 4F provides an additional view of the object of training in spatial coordination with a trainee (user)

As shown in FIGS. 4A, 4B, and 4F, the "object of training" platform 400 for the simulator system of the invention combines a synthetic head and neck, 410, with replaceable eye trauma "modules", 416. The object of training 400 may be complemented with external sensors 420 to track position, orientation and function of a suite of ophthalmic surgical instruments. The process of data acquisition with the use of the object of training in effectuated, as discussed below, with segmentation of surgical gestures (Event Driven Surgical Gesture Recognition, or EDSGR) into a series of quantifiable "events" that can be used to evaluate performance and provide contextually relevant feedback. (While the EDSGR has been developed for this specific type of surgery, it remains a general approach that can be applied in many other specialties of the surgery.)

An example of embodiment 400, the mannequin head, is in the form of a life-cast silicone skin over a solid core, with a socket/opening indicated by line 424 and available for a left-eye trauma module. In an embodiment, a version of the simulator can include a mannequin head based on computed-tomography-derived anatomy; can have left and right eye replaceable trauma modules; can have replaceable eye globe trauma modules mounted onto a pivoting joint to allow for surgeon manipulation of the globe and passive restoration of the globe position. Alternatively or in addition, an embodiment may have anatomical range of neck motion using serial linkages attached to the framing structure so that a trainees can move the head to surgically relevant positions; can have position tracking sensors in the head so that the host computer can be able to provide registration between the head's position (and eye trauma module location) and the positions of the surgical instrument.

Eye Globe Module.

Figure 4E:
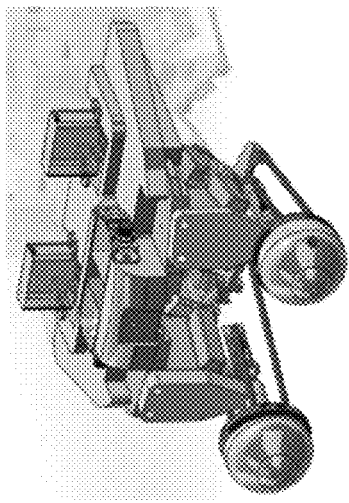
FIGS. 4C, 4D, and 4E are diagrams illustrating repositioning and/or driving mechanisms used to operate an eye globe structure for use in the replaceable module of FIG. 4B.
Figure 4D:
Figure 4C:
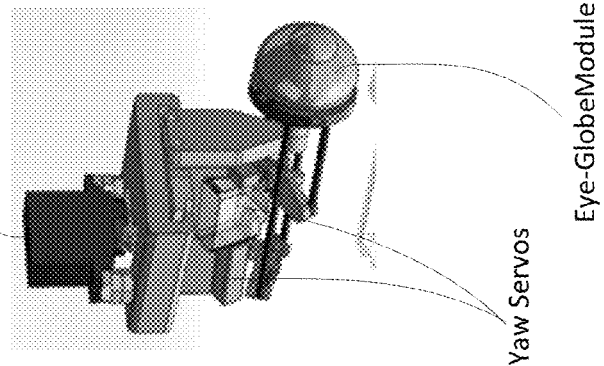

In reference to FIGS. 4C, 4D, and 4E, one replaceable eye trauma module, 416 includes a replaceable eye portal which can replicate a variety of injuries and have the ability to be interchanged on the mannequin. The eye globe model within the portal is an artificial model of a human eye that mimics the real eye anatomy which is based upon anatomical statistical averages of curvature and thickness. Internal eye components can include: sclera, cornea, iris, lens, and vitreous gel but can be expanded to include additional anatomical structures.

A replaceable globe module is mounted to a pivoting platform for each of the left and right eye that pivots under the control of the drive mechanism. A module includes a partial spherical globe, with a conical seat that mates with the pivoting platform. The globe module includes a conjunctiva layer/structure that seats and seals against the mechanism's protective sheath, forming a closed space outside the globe, inside the eye socket. A globe module includes a series of fluid ports that transmit fake blood from an internal reservoir into the subconjuctival space (between the conjunctiva and protective sheath), to permit simulation of hemorrhagic chemosis, one of the signs of retrobulbar hemorrhage. Additional fluid ports in the eye globe module provide access to the interior of the globe to provide control of pupil mechanisms representing contraction and dilation of pupils in the globes. Other fluid ports in the eye globe provide a supply of clear fluid to lightly pressurize the globe so that if there is a laceration, fluid may seep out through the laceration, or be squeezed out due to external pressure, or be used to test for water-tightness of suture repairs of the globe.

The eyelid/external tissue modules comprise silicone or other soft tissue analogs for skin, reinforcing layers embedded in the silicone (or other), and stiffer silicone or other polymers with reinforcement for harder structures such as the tarsal plates of the eyelids. They also include a harder structure that represents the orbital rim region of the skull and provides for alignment and attachment to the rest of the skull. The tarsal plate structure for at least the upper eyelid has a tensioning structure that is linked to the blinking motor/servo in the drive mechanism, so that when actuated, the soft tissue lid is pulled open, and when the motor is released/returned to closed position, the eyelid returns to the closed position. The eyelid modules may include structures that are analogs to the lacrimal ducts and canaliculi, so that surgical repair of a lacerated eyelid with canalicular damage can be simulated. The eyelid modules are designed to represent either healthy tissue (the default), or have injuries molded into them, including lacerations through part or all of the eyelid and possibly including lacerations through the canaliculi. The eyelid modules also include analogs of the lateral canthal tendons, so that lateral canthotomy and cantholysis procedures, which release the lower eyelid to reduce pressure on the globe during retrobulbar hemorrhage scenarios.

Eye Globe and Lid.

Figure 5C:
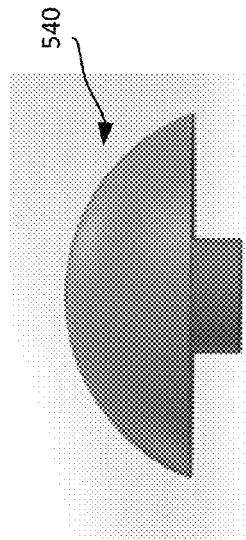
FIGS. 5A, 5B, 5C, and 5D are diagrams illustrating the process of fabrication of the eye globe structure for use with the replaceable module of FIG. 4B.

An embodiment of the eye globe was structured as a water-tight membrane that reproduces the look and feel of the human eye and allows corneal surgeon to practice suturing techniques. The eye globe module is the most complex silicone part in the OCF trauma simulator, and its construction is equally complex. According to an embodiment of the invention, the eye globe module includes 5 parts: the sclera, the lens, the iris, the cornea, and the backing. Each piece is formed by a different part of a modular mold. To ensure that the eye globe is formed as a multi-chambered, water-tight construction of the eye globe, one embodiment of the formation of the eye globe was configured as follows:

First, a uniform coating of thinned silicone (silicone: Dragon Skin 20, Smooth-On, Inc. 2000 St. John St., Easton Pa. 18042; thinner: Naphtha, Sunnyside Corporation—225 Carpenter Ave Wheeling, Ill. 60090) was applied to the domed surface 510 and concave surface 520 of the scleral mold, as shown in FIG. 5A, and cured at 200° F. for 5 minutes. The lens spacer 528 was then installed into the inner volume 530 of the scleral mold 524, FIG. 5B. The lens spacer 528 had been created using VeroClear Polyjet 3D printing resin (Stratasys, Ltd.) Next, a thin layer of pigmented silicone (silicone: Dragon Skin 20; pigment: SilcPig, Smooth-On, Inc.) was applied to the convex surface 528A of the lens spacer, ensuring that the uncured silicone touches the scleral margin. Iris detailing (paint: Psycho Paint, Smooth-On, Inc.; pigment: SilcPig) was then optionally applied to the back of the corneal spacer 540 and then force-cured at 200° F. for 3 minutes, after which the corneal spacer was installed on the lens spacer 528.

Figure 5D:
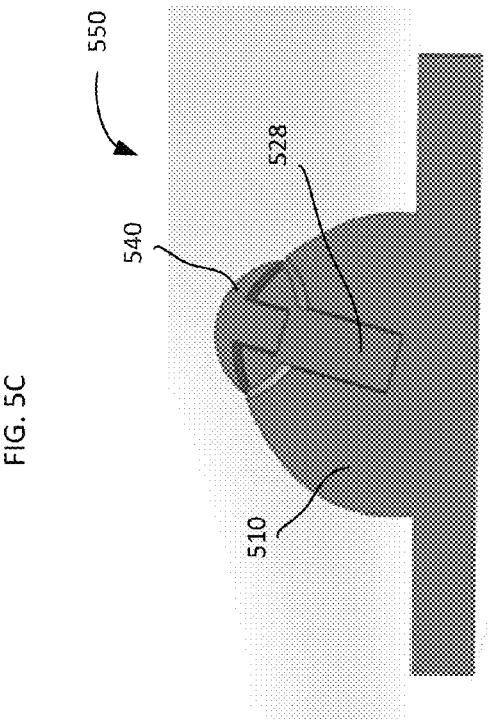
Figure 5A:
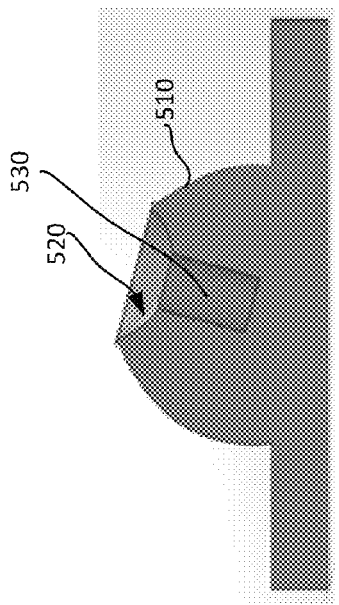
Figure 5B:
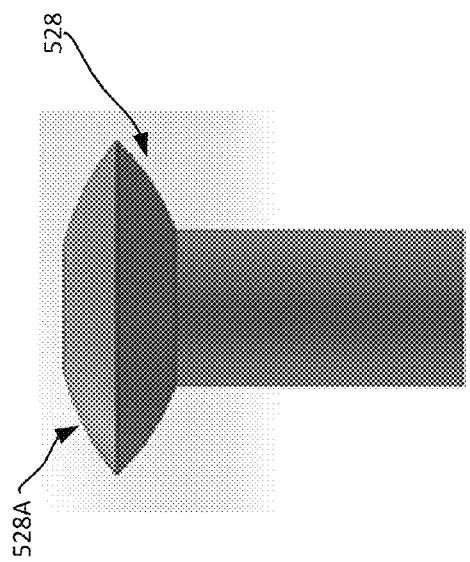

The assembly 550 of all components, shown in cross-section in FIG. 5D, is then force-cured for 20 minutes at 100° F. Once cured, a uniform layer of clear thinned silicone (silicone: Dragon Skin 20, Smooth-On, Inc.; thinner: Naphtha, Sunnyside Corp.) is applied over the entire module and allowed to cure at room temperature. These steps constitute an embodiment of a process of fabrication of the front half of the eye globe module.

Once the silicone was cured, the part was ejected from the scleral base and the lens spacer 528 carefully removed. The part was then submerged in a bath or room temperature water for 4 hours in order to dissolve the corneal spacer 540.

Figure 10A:
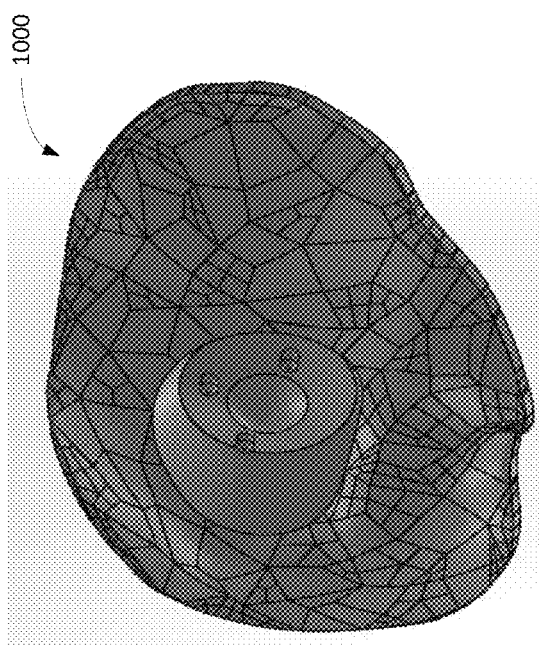
FIG. 10A is a diagram of a CAD model of part used to create the backing plate of an embodiment of an eye globe module of the invention.

Once the spacer 540 is dissolved, the part was dried completely in a 200° F. oven. A lens could now be installed (made of rubber: Clearflex 50, urethane rubber, Smooth-On, Inc.) A thick coating of tinted silicone (silicone: Dragon Skin 20, Smooth-On, Inc.; pigment: SilcPig, Smooth-On, Inc.) was then applied to the backing mold 1000 (created using ABS-P430 model material, Stratasys Corp.), shown in FIG. 10A. The front half is pressed onto the uncured silicone in the backing mold and the assembly is force cured for 1 hour at 200° F. Once the assembly was fully cured, any flashing was removed and the eye globe was tested to ensure it is air-tight. If there is a leak, the module must be discarded.

Once air-tightness is verified, the module is injected with a silicone gel (silicone: Eco-Flex 10, Smooth-On, Inc.; additive: Slacker Tactile Mutator, Smooth-On, Inc.) and placed cornea up on a flat surface and allowed to cure. The silicone gel acts as a 'self-healing' barrier which allows saline solution to be injected into the module. Once the gel layer was cured, a syringe was used to remove the air from the module. Saline solution was then injected into the module, re-inflating it.

Figure 10B:
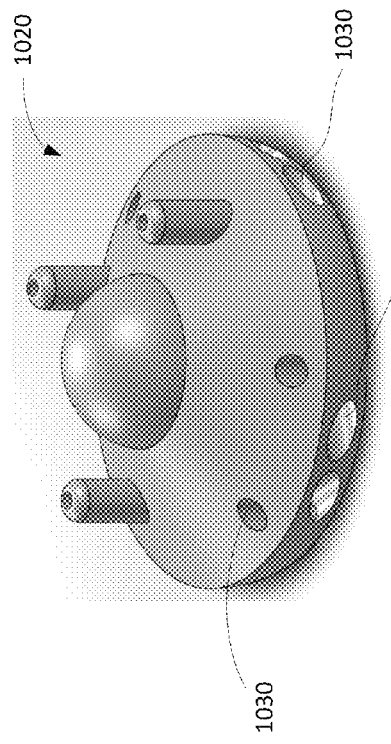
FIG. 10B is a diagram of a CAD model for the mating plate onto which an embodiment of the eye globe is mounted.

FIG. 10B illustrates a CAD model for the mating plate 1020 onto which the eye globe of the embodiment is mounted. When the eye globe is fabricated, it is press fit onto the baseplate 1020. The ports 1030 with which the plate 1020 is equipped are used to introduce fluid (such as saline, simulated blood, etc.) into the network of hollow channels of the embodiment, as discussed below).

Corneal Spacer.

The corneal spacer 540 (FIG. 5C) serves to create a hollow chamber between the cornea and iris, and must be removed after the cornea element is cured. After many attempts to remove a plastic spacer (created using VeroClear Polyjet 3D printing resin, Stratasys, Ltd.) without tearing the thin membrane of the cornea failed, water-soluble wax (wax: Sol-U-Cary Wax, Freeman Mfg & Supply, Avon, Ohio 44011) was employed as the corneal spacer material. In order to accomplish this, a silicone mold (silicone: Mold Star 30, Smooth-On, Inc.) is injected with the molten wax and allowed to cool. The convex surface is then polished to ensure that a smooth cornea is produced.

Eye-Module Vascularization.

Figure 11:
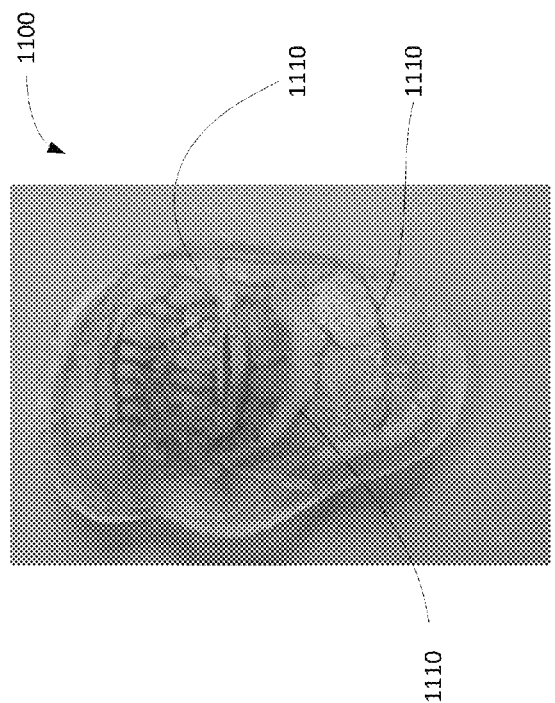
FIG. 11 is an image of an embodiment of a highly-vascular eye-lid containing a network of hollow channels filled with fluid to resemble the venous system of the eye.

Skin is highly vascular, and the human eyelid is no exception. In order to produce a more life-like module, an embodiment of highly vascular eyelid was fabricated. The difficulty with producing hollow channels inside a solid silicone part led to a decision to the use of wax wire as the medium for fabricating the vascular structures. The wax wire (wire: Kewax, Keystone Ind., Myerstown, Pa. 17067) was bent and welded into a complex matrix resembling the venous system of the eyelid. Two wax sprues were then attached to the wax wire. These sprues acted as a mounting feature for installing the wax in the mold, as a path for removing the wax after casting, and as socket for tubing connectors (connectors: McMaster Carr part #5372K511) later on. Once the wax was installed into the mold, the silicone was injected and allowed to cure fully. The part was removed from the mold and placed into a 300° F. oven for 30 minutes. During this time, the wax melted and leaked out of the sprue holes. Once the majority of the wax melted out, plastic tubing connectors were installed. Flexible tubes were then connected to the part and air was injected into the channels, forcing out any remaining wax. These processing steps resulted in a complex series of hollow channels 1110 resembling the venous system of the eye, as shown in the embodiment 1100 of highly vascular eyelid, FIG. 11. These channels can be filled with simulated blood using by way of the tubing connectors. When such prosthetic eyelid 1100 is cut, the module bleeds in a manner similar to a real human eyelid.

Figure 12B:
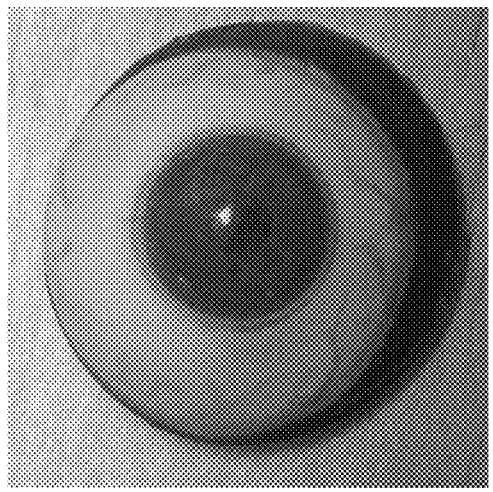
FIGS. 12A, 12B show an embodiment of the eye globe of the invention in front and rear views, respectively.
Figure 12A:
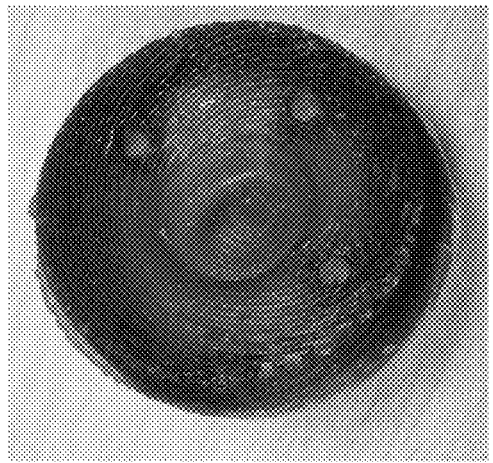

FIGS. 12A and 12B provide additional illustrations of an embodiment of the eye globe in front and rear views, respectively.

Repositioning and Driving Mechanism.

In further reference to FIGS. 4C, 4D, 4E, and 4F, the drive mechanism includes motors that drive both a left and right eye globe module in pitch and yaw independently, drive the left and right globe modules in proptosis (forward protrusion) mechanism independently, and drive independent blinking of the left and right eyelid/external tissue modules. The mechanism includes a strain gage sensor to detect if pressure is being applied to the globe module and to quantify such pressure (as excess pressure applied to a damaged eye may damage it further. The pitch/yaw mechanism includes elastic cords that connect the globe module and the motors, so that a surgeon can manipulate/back-drive the eye globe, similarly to the normal elasticity of the eye muscles. The mechanism is currently controlled using R/C servos, however other motor/sensor combinations or mechanisms including pneumatic pistons or others could be used.

The drive mechanism is designed as an assembly that is mounted into the skull of the head/neck structure of the full simulator. As there are hemorrhage components of the system (a prosthetic eye-ball discussed above), a protective sheath separating the external regions of the skull and eye socket from the mechanisms described above is included in each eye socket structure.

Sensors for Object of Training.

Some of the components of an object of training—such as, for example, the canthotomy/cantholysis components of the eye globe module and the cricothyroidotomy components of the neck region—are optionally structured to include electrical sensors for detection of incision and determination of the incision path.

Embodiments of sensors for detection of incision are structured around one or more operationally-complementing each other conductive layers within the prosthetic tissue of the object of training. The conductive layers are linked to a specifically-dedicated electronic circuit structured to measure voltage from one or more terminals attached to the conductive layers. There are two primary forms of the incision-detection circuit: one which detects only whether a component of the object of training has been completely severed; and one which detects the position and path of a cut when made with a conductive (e.g. metal) instrument such as scissors, scalpel or needle.

The first type of the incision-detection sensor 900 of the invention, shown FIGS. 9A, 9B in top and side views, respectively, includes a strip 910 of conductive material cast (or otherwise built) into the rubber sheet, connected at both ends to the incision-detection circuit. The conductive material in one implementation of the sensor is an XYZ electrically conductive adhesive tape (3M, part number 9712), one end of which is linked to electrical ground, while the other end is affixed to a digital input terminal with a pull-up resistor (or a similar feature). The layer 910 is connected to ground at one end and to a digital input with pull-up resistor 914 at the other. Resistance of the pull-up resistor 914 is larger than resistance of the sensor region. When the sensor is new (layer 910 is not cut), the digital input terminal reads "low", since the ground terminal is connected to the digital input through the conductive tape sensor (input voltage to the DAQ is caused to be low as the pull-up resistor and sensor form a voltage divider). Cutting partially through the sensor causes the resistance to rise as cross sectional area falls, causing rise in input voltage. When the tape 910 is completely severed, the ground connection is lost and the pull-up part of the digital input raises the voltage to "high", informing the host computer of the mannequin (for example), that cutting is complete. (An embodiment of the incision-detection sensor could be modified to use an analog input sensor, also with a pull-up component, so that as the sensor is partially severed, the sensor's cross-sectional area decreases and thereby increases resistance, so the pull-up component causes the measured voltage to rise.)

The second type of the incision-detection sensor of the invention includes two or three strips/sheets of conductive material (also 3M 9712) separated by (a) thin insulating layer(s), the whole assembly embedded in the anatomical component to be severed/incised/pierced.

A) In the three-sheet version 920, shown schematically in FIG. 9C, one sheet 924 has high conductivity electrodes (e.g. wires) along its left and right edges, which are attached to voltage supplies that can be set to "low" or "high". Another sheet 928 has electrodes attached to the top and bottom edges, with the same voltage control capabilities. These two sheets are the drive layers. The remaining sheet 930, the sensing layer, may have electrodes completely around the edge of the layer, which are attached to an analog input terminal with high impedance, for sensing by the host computer or circuit. The above-discussed sheets can be arranged in any order, top to bottom. In one implementation, however, the sensing sheet or layer is the lowest in the "stack" and farthest from the outer surface of the object of training. In this configuration the blade must cut through both drive layers before reaching the sense layer, so that cut position in both the left/right and up/down (i.e. x-direction and y-direction) will be sensed. (Different configurations of sheets do not necessarily guarantee such advantageous result, as an incomplete cut (a cut through only a portion of the thickness of the object of training element) may pass only through one drive layer and the sense layer, thereby effectuating the sensing of an x-direction position of the blade while not effectuating the sensing in y-direction, as a result of which the system would be unable to calculate the complete position of the blade/needle.)

During the operation of the simulator system, one drive layer (for example, the one effectuating the detection/sensing of cutting/piercing in x-direction) is energized so that one edge is at "high" voltage, while the opposite edge at "low" ("high" and "low" are on the order of 0.5 and 4.5V in one implementation, but could be different). A voltage gradient is therefore formed across the layer with voltage proportional to a position across the layer. The electrode of another, second drive layer are set to high-impedance mode, so that no current can pass from such layer, rendering it essentially passive.

Thin dashed lines 940 show location of blade/needle piercing through the three layers and indications of distance between electrodes of a given layer. (Not shown are insulating layers between each of the conductive layers.) If a blade cuts through the energized drive layer, the blade takes on the voltage at the location of the incision. If the blade also cuts through the sense layer, the blade creates a path to the sense layer and establishes the same voltage across the entire layer. Because the analog input terminal does not draw significant amounts of current, there will be negligible voltage differences from the contact point between the blade and the sense layer. As this voltage is proportional to the position of the incision through the drive layer, the cut position can be calculated based on measuring the voltage in the sense layer.

The active drive layer can be then disabled, its voltage terminals set to high-impedance mode, and the second drive layer (the one operably effectuating the detection/sensing in y-direction) is energized to establish a voltage gradient orthogonal to the first drive layer. As before, the blade cutting through the active drive layer conducts the voltage to the sense layer, without disturbance by the other drive layer, which is inactive.

The above-described process of activation can be alternated at a frequency (rate) sufficient for governing the x- and y-position measurements at a speed sufficient to capture the motion of the blade though the prosthetic tissue of the object of training. In one implementation the alternation rate of sensor-switching was chosen to be above 100 Hz. The rate of sampling the data during the process of cutting through the sensor should be sufficiently high so that the position of the blade, moving at a particular velocity can be sampled quickly enough to be able to reconstruct the path of the cut accurately. For example, assuming a cut length of 2 cm made over the course of 1 second, if the system acquires an x-position reading, and choosing the switching between the read out of the electrode measuring the x-position of the cut and that measuring the y-position of the cut chosen to be at 100 Hz (each reading being taken in 5 ms or less), the position resolution of the measurement of the cut path can be approximately 0.2 mm (more than sufficient to detect successful performance of a cricothyroidotomy, for example). The minimum sampling rate should be determined by the type of procedure being performed (based on typical length and velocity of the cut). Maximum rate will be determined by the data acquisition system, which should be higher than the minimum requirement, and limited to avoid acquiring more data than necessary. This rate may be limited, in practice, by the speed of the analog input terminal's analog to digital converter (or similar circuit for acquiring voltage measurements) and any capacitive effects in the sensor, which can take some minimal time for the drive layer to become completely active and then switch to high-impedance mode.

For a needle passing through an embodiment of the incision-detecting sensor, a position is established upon insertion. The sensor can be used multiple times because piercing small holes through the sensor does not significantly change the electrical characteristics in terms of generating the gradient across the drive layers or conductivity through the sense layer.

For a blade cutting through the sensor, the sensor performance may decay with increasing cut length, as the section that is cut is expected to lose conductivity, thereby changing the original voltage gradient and distorting the sensing capabilities of the sensor.

B) An alternative version 950 of the incision-detection sensor (FIG. 9D) employs two conductive layers, 954 and 958. In this case, the former sense layer of the three-sheet version is not present, and the drive layers 954, 958 are connected to two different analog input terminals (or through a multiplexer or similar circuit to a single analog input terminal). When one of the layers (corresponding to the detection in x-direction) is energized, the other drive layer (corresponding to the detection in y-direction) has its drive terminals set to high impedance and also connected to the analog input terminal. (In comparison with the three-sheet version, this second drive layer then takes on the role of the passive sense layer of the three layer version.)

Following the measurement of a cut position in the x-direction, the active layer is set to high impedance and connected to the analog input terminal, and the other drive layer (the y-direction layer) is then enabled to allow measurement of cut/pierce position in the orthogonal direction. This two-layer version of the sensor has a simpler mechanical structure with less sensor material to cut through, but may require a more complicated interface circuit for data acquisition and processing.

Event-Driven Gesture Segmentation and Recognition

The architecture of the simulator algorithm and computer-program product implementing such algorithm is based on the use of an event-driven surgical gesture recognition (EDSGR) methodology. For a given simulated medical procedure to be performed at the simulator system, the EDSGR methodology employs a reference set of expert-derived descriptions of the correct sequence of steps of such procedure, a set of descriptions of optional procedural elements, a set of variations or deviation in sequencing of steps (from the correct sequence of steps) that are acceptable and/or tolerable in performing a given procedure, and a set of identifiers of typical practical errors/deviations from the reference(s) that are made in practice by a trainee/user of the simulator.

Surgical performance is commonly evaluated through the analysis of movements and trajectories obtained from tracking the path of the surgical instruments, and their associated geometrical (spatial), and temporal features (e.g. smoothness, speed). For example, efficient movements made by an experienced surgeon are typically more localized within the surgical field than those of a novice. Motions can be reduced into a set of tasks, with evaluation metrics applied to each task. Some work has been devoted to automatic gesture recognition, e.g. using human anatomy-driven hidden Markov models (HMM). Rather than performing continuous motion analysis as it is done by related art, embodiments of the present invention are configured to formulate tasks by identifying sequences and combinations of discrete events. Comparison of novice performance with pre-defined expert sequences is expected to permit the generation of timely and useful automated feedback, which can be provided by our simulator.

Since some embodiments of the surgical instruments of the invention have tracking sensors attached to them (as discussed, for example, in reference to FIGS. 2A through 2E), the spatial positions and orientations of such instruments over the training session can be captured and analyzed to compute a performance assessment ranking of the trainee's skills compared to an average expert for a particular task. Performance assessment can include a score from 0 to 100 where 0 is a complete novice and 100 is equivalent to an expert surgeon. The assessment also shows the trainee their individual ranking in several key metrics such as time, path length, smoothness of motion and orientation to name a few. A trainee assessment is shown as a graph. The performance assessment algorithm is based upon kinematic analysis and z-scores.

In stark contradistinction with the commonly-used motion-tracking methodology, focusing attention on "events" generated by the system is that events contribute significant intermediate representations of information. This serves to discretize the movement recognition and analysis process based on pre-defined thresholds (be that thresholds representing spatial regions or threshold representing types of motions that are specific to a given surgical operation), thereby reducing the complexity of segmentation of an otherwise continuous movement into a stream of movement "characters". An event is defined as an action that can change the state of a state machine (for example, opening/closing of a specific instrument, grasping with forceps, or entering/exiting of the instrument from a specific spatial region-of-interest). An event is generally accompanied by an occurrence of realignment of an object with which a particular gesture or task is performed. For example, an event is accompanied by a re-alignment of an instrument (such as repositioning, re-orientation, change of shape, opening/closing). Based on registration of such events, the methodology of the present invention facilitates the identification of specific patterns of events/states that clearly correlate with specific gestures, subtasks and tasks of a simulated medical procedure. This event-driven approach may be extended to a wider range of surgical procedures. The event-driven approach may also be implemented using other paradigms than a hierarchy of state machines; appropriately structured neural networks and other algorithms known to those skilled in the art would also perform the necessary processing. Where "state machine" is used in the text, other algorithms may be substituted. The proposed approach is expected to yield a significant decrease in computational cost, as at each time step, only new data points are analyzed, rather than retrospectively analyzing a moving window of data, typical of path analysis approaches. Motion path analysis is available, but would be done conditionally, with focus on small segments. This efficiency should allow the development of real-time gesture analysis and feedback.

EDSGR is based on a hierarchical task analysis of surgical tasks such as—in one embodiment, illustrated later in reference to FIGS. 6A, 6B, 6C, 6D, 6E, 6F, 7, 8A, and 8B—a repair of a full-thickness eyelid laceration. Major steps, such as examination of the injury, approximation of lid margin, suturing of the tarsal plate, etc. are broken down into tissue manipulation steps, needle throws, knot tying, suture trimming, etc., which are in turn broken down into distinct instrument motion events. The lowest level events correspond with, for example instrument tip entry into or exit from geometric regions of interest around important structures, avoiding the need for computationally expensive continuous motion analysis, or opening or closing the jaws of an instrument. EDSGR is designed to recognize correct completion of task elements, even when differences in performance style diverge from a "standard" sequence.

According to the idea of the EDSGR methodology, the algorithm is configured to form a hierarchy of state machines to detect sequences of events and compare the detected sequences with the expert-derived nominal, reference sequences. When the detected and reference sequences are substantially matched, the system forms an output representing "correctness" of the progress of a given simulated medical procedure through a scenario and presents additional content of the procedure to the trainee (such as, for example, further instructions regarding next steps of the simulated medical procedure). On the other hand, the detected deviations from the nominal sequence are interpreted as either acceptable variations (for example, when knots may optionally be tied after all sutures have been placed or immediately after each suture is placed,) or minor errors that trigger visual and/or audible warnings generated by the simulator 100, or major deviations that trigger the presentation (for example, on a display 180 of the simulator 100), to the trainee, of additional content of the medical procedure that illustrates correct steps for the given scenario. In other words, upon determining a deviation of multi-level hierarchy of descriptors of the sequence of movements from a reference hierarchy to generate a mismatch output representing whether the deviation is within a tabulated acceptable range.

In implementing such hierarchy, the EDSGR algorithm is configured to subdivide a given description of a procedure (for example, a description of surgical gestures or motions corresponding to a certain procedure to be simulated in an eye trauma treatment simulator) into finer and finer levels of spatial detail, to the point at which the description includes sequences of events defined by crossings of geometric boundaries within the workspace and crossings of thresholds of force and closure of the instruments. Such segmentation is based on the analysis of system and environmental events generated in tracking user's performance. Subdivision of surgical procedures into tasks and sub-tasks allows for application of more accurate metrics (appropriate to each level of analysis), which may more appropriately evaluate user performance. An example of such EDSGR-hierarchy is presented in FIGS. 6A, 6B, 6C.

Figure 6D:
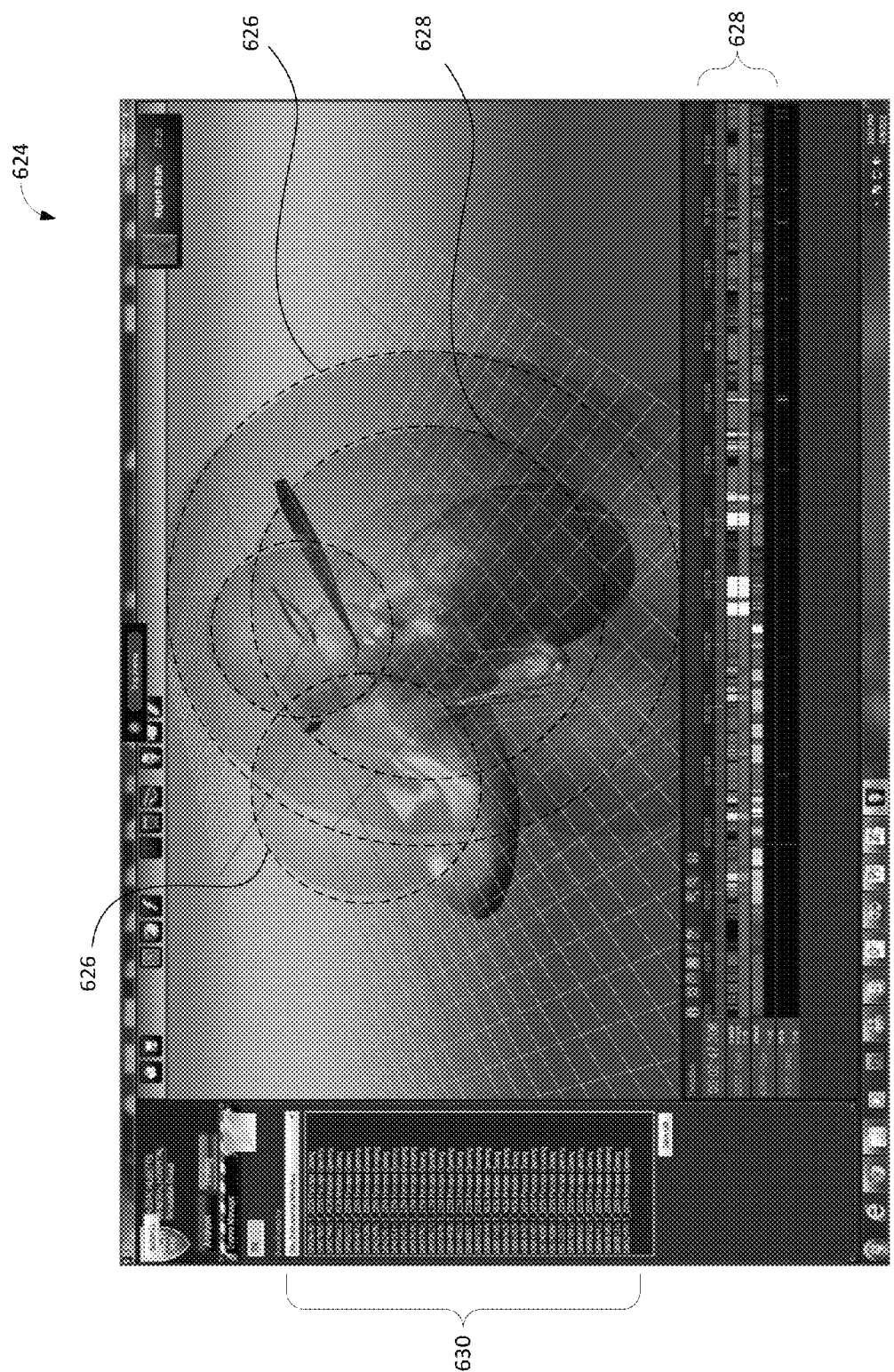
FIG. 6D provides another user interface screen the projector showing an animated instrument display with multiple spherical ROIs, color-coded instrument grasp position/force traces 628, and automatically generated list of events.

In reference to the example of FIGS. 6A, 6B, and 6C and in the context of defining the spatial Regions of Interest (ROIs) within the workspace about the object of training, boundaries define the borders of ROIs, which are surgically relevant geometric spaces about the object of training (such as, for example, a zone—with a boundary 610—of a specific radius centered, in one example, at the eye globe 614, as shown on the image 620 displayed at the video projector 134; and/or spatial zones near the instrument rack 138, shown as 622). The ROIs can be chosen to be spherical, or can be more complex spatially, for example built up of multiple spheres, or even be defined with the use of metaballs algorithms to define complex continuous surfaces; other geometric descriptions may be alternatively used. Generally, ROIs can be fixed in a specific location of the workspace or they can also be structured to be repositionable and track an instrument 618, for example, so the location and the radius or even the shape can depend from specific variables eventually For example, when during the manipulation of a given instrument 138A, 618 by the user of the simulator 100 an instrument tip enters or exits an ROI (crosses its boundary 610, in the example of FIG. 6C) as detected by the magnetic tracking system, the EDSGR algorithm registers an event (for example, electronic circuitry of the simulator produces an output representing the change of spatial positioning and/or orientation of the instrument that causes a boundary of the pre-determined spatial ROI to be crossed). Similarly, when in the process of closing or opening of a given instrument 138A a pre-determined threshold value defining the change of the operational status of the instrument between "open" and "closed" is crossed, or when the instrument gauge(s) detects that force load applied to the instrument is above a pre-determined force threshold, the EDSGR algorithm also registers an event (in this case, by producing an output in response to a signal from the instrument's sensor(s) representing, depending on the specific circumstances, either an above-the-threshold change in force applied to the instrument or a change in derivative of force applied to the instrument). Generally, therefore, the algorithm registers an event based on recognition that data acquired by a detection unit of the simulator system (instrument position/orientation data acquired with magnetic tracking system) indicating that a change in operational status of the instrument, represented by realignment of the instrument (opening/closure, repositioning, reorientation in space), exceeded a predetermined operational threshold. In a related embodiment, the system can be structured to track motions of hands of the user (with optical system 110) to generate events. FIG. 6D provides a developer-interface screen 624 to review the motions/re-alignments of the instruments, showing animated instrument display, multiple spherical ROIs 626, color-coded instrument grasp position/force traces 628, and automatically generated list of events 630.

The methodology of the invention can also be applied in other surgical contexts. For the specific case of eye trauma treatment this system can generate different classes of events that, when combined, may drive a state machine with the capability of subdividing the macro operation(s). The results of this process are further utilized to develop informative feedback to the user in the form of performance metrics and training guidance.

Figure 6E:
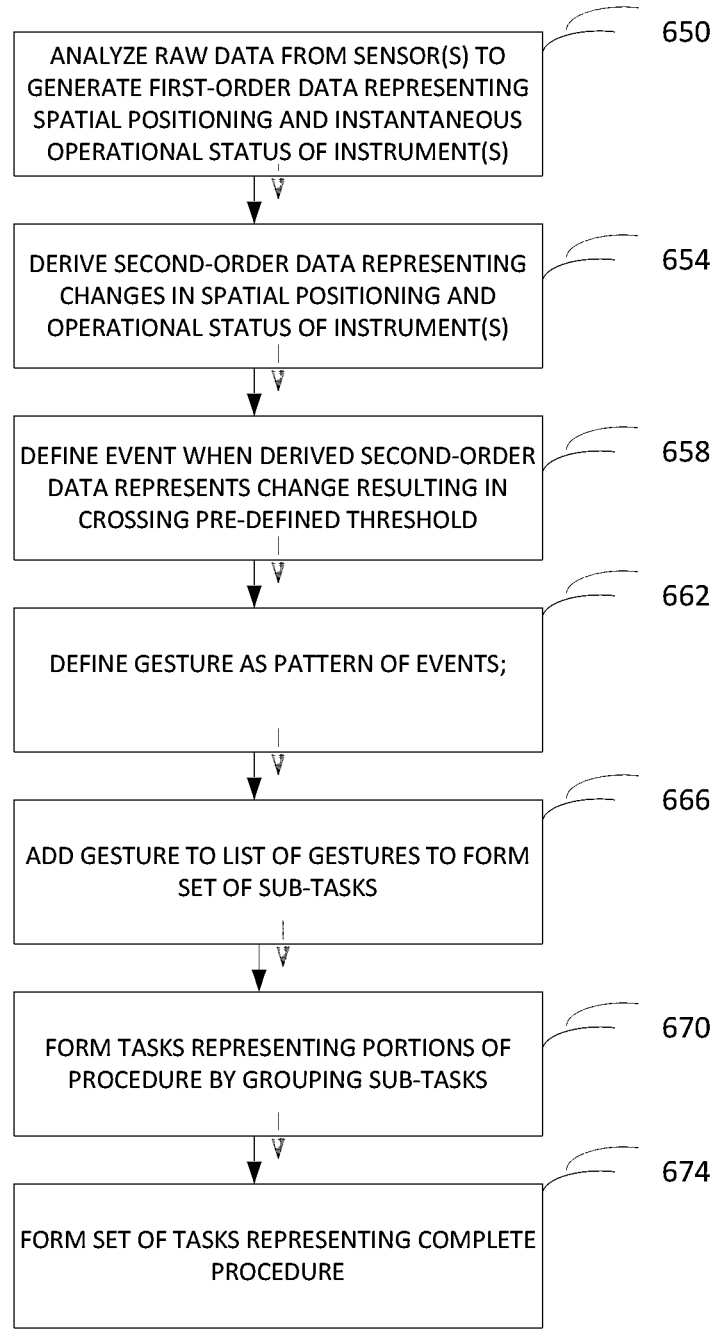
FIG. 6E is a flow chart of an embodiment of the method of the invention.
Figure 7:
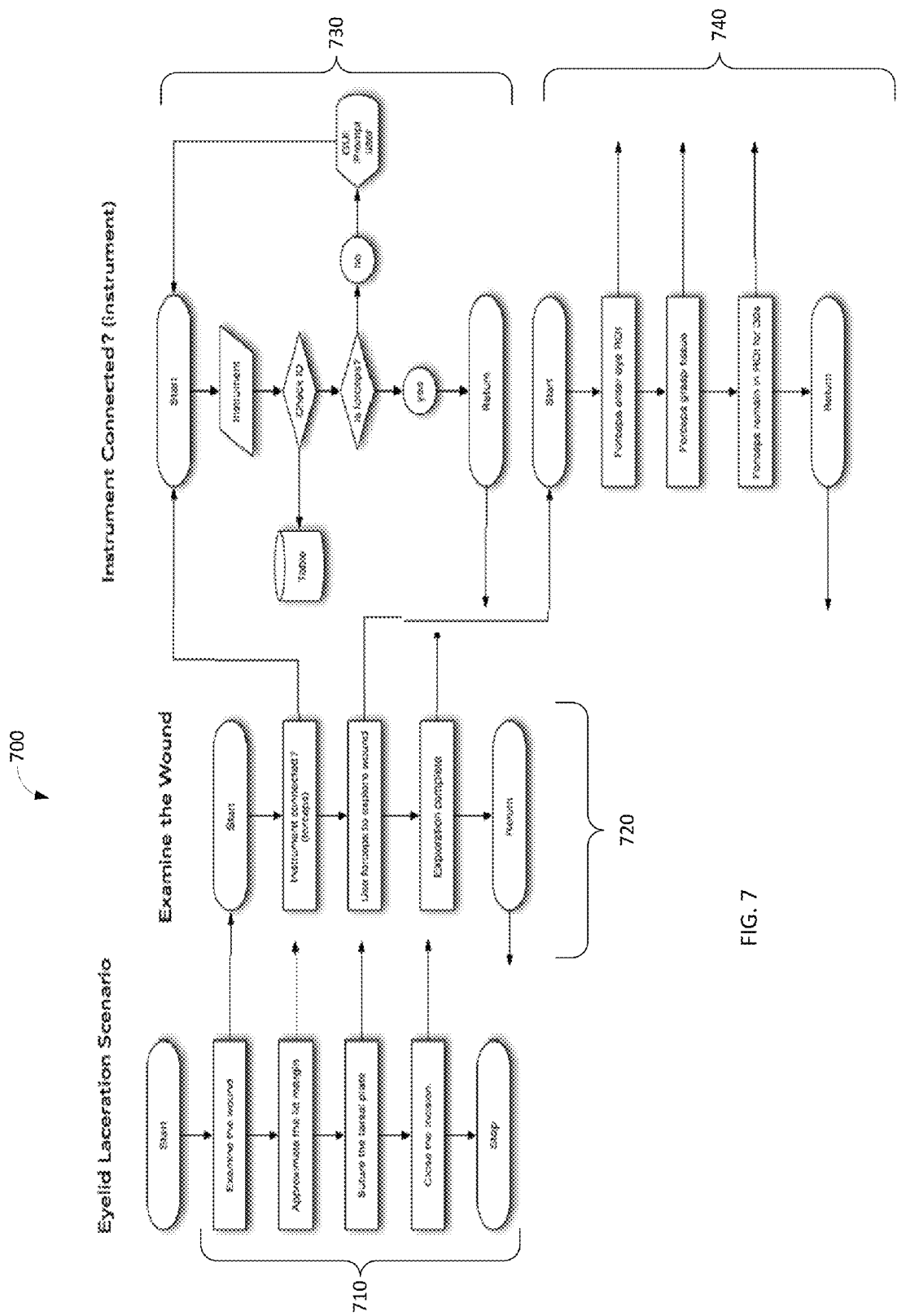
FIG. 7 is a flow chart representing an embodiment the method directed to training of eyelid laceration repair with simulator of the invention.

The methodology utilized for surgical gesture segmentation and task recognition is driven by specific patterns of events generated by the system. In further reference to the hierarchy shown in FIGS. 6A and 6B, FIG. 6E provides a flow chart of the algorithm of the invention. At step 650 in the application of the EDSGR approach is the analysis of all the existing sources of data of the system (referred to as first order data). At step 654 the available raw data is processed to generate a second order data derived from the first order data. At step 658, appropriate threshold values (after appropriate filtering if required, such as low-pass filtering to limit noise in the data stream) are applied to the second-order data in order to generate, for each data source, specific events representing the behavior of the part of the system in question (such as an instrument). This step can be considered an event-mapping procedure. At step 662, the identification of specific patterns of events occurs, for specific low level gestures, to make such low-level gestures unambiguous and repetitive in the execution of a specific procedure. Each recognized gesture is added to the list of gestures when step 666 is performed, which is recognizing specific patterns of gestures (referred to as subtasks). One more level of recognition is performed on the subtask list at step 670 and, at step 674, tasks are recognized that aggregately serve to identify an entire simulated surgical procedure. Patterns of events that the simulator system is not able to recognize are discarded (not shown).

The embodiment 100 of the simulator of FIG. 1A enables a process of collecting the natural human interaction data in a highly-structured fashion to support initial investigation into our theory of event-driven surgical gesture segmentation and subsequent task recognition. The following list is but an example of the sequence of sub-tasks of the protocol for performing eyelid laceration repair, defined by an expert user, and illustrates the specific application of the EDSGR methodology. The sub-tasks listed contain lower level requirements on the ROIs in which the sub-tasks are performed.

1. Grasp suture from tray and load the needle in the needle holder.
2. Double-bite through both sides of incision, pull length of suture through.
3. Double-bite with 2-1-1 surgeon's knot, excess cut with scissors.
4. Single-bite through both sides of incision, pull length of suture through.
5. Single-bite with 2-1-1 surgeon's knot, excess cut with scissors.
6. Suture placed, pull length of suture through until ready to tie knot.
7. Suture placed, tying of 1-1-1 surgeon's knot.
8. Suture placed, tying of 2-1-1 surgeon's knot.
9. Suture placed, tying of 3-1-1 surgeon's knot.
10. Suture placed, tying of 3-1 granny-1 adjustable surgeon's knot.
11. Grasp tissue with forceps, light pressure.
12. Grasp tissue with forceps, normal pressure.
13. Grasp tissue with forceps, heavy pressure.
14. Vertical mattress suture.
15. Running suture.

Example of a sub-task of the protocol according to the EDSGR methodology:

As would be understood by a skilled artisan, the following provides an example of direct identification markers that can be used for a sub-task (8) above, of tying the 2-1-1 surgeon knot: Needle point pierces tissue; Needle retrieved from tissue; Needle pulled far from eye (to have enough thread to tie a knot); Knot throws initiated; Knot pulled taught; Scissors retrieved from tray; Cut with scissors.

Further discussion below in reference to FIG. 6F illustrates practical taxonomy of the sub-task of using scissors to cut suture ends. The raw data collected by the simulator were parsed to begin with to extract events that characterized this known task. Each track of data was analyzed using three different methods: visualization of the raw data received from sensors, characterization of the video information recorded with the use of camera 118, and normalization across all three sessions for each of the three subject matter experts (SMEs). Using different combinations of event sequences and their derived gesture sequences, higher levels of the taxonomy can be identified. Here, the sequence of events can be interpreted as the gestures: (A) "removal from tray," (B) "entry into working space," (C,C) "cutting of suture ends," (D) "exit from working area" and (E) "return to tray." Over multiple SMEs and multiple repetitions, this sequence of gestures was the same. Different bands 680a, 680b, 680c, 680d correspond with nested spherical ROIs centered on the cornea (one of which is shown in FIG. 6C as 610), such that the vertical position of a band in the stack of bands of FIG. 6F represents a larger radius of a corresponding sphere. Band 684 represents the tool tray ROI 622. (Such taxonomy could be displayed with the projector, or shown on the touch screen, or projected through the AR microscope).

In context of training directed to eyelid laceration repair (a flow chart 700 of which is schematically presented in FIG. 7, steps 710, 720, 730, 740), both the forceps and the needle holder start within a moderately small ROI near the eyelid. During the process, the needle holder approaches more closely, entering a smaller ROI. Presence within the smallest ROI and the closure of the needle holder identifies the grasping gesture. The subsequent opening and closings are releases and re-grasping gestures as the needle passes through the tissue. The departure of the instruments from the nested ROIs suggests pulling the needle to draw the suture through the skin, and in combination with orientation thresholds (not shown) the forceps are palmed, pointing away from the suture site, hence apparently moving away, through the sequence of ROIs. This example illustrates the sequential re-composition of the raw data, events detected, and gestures into a subtask. Longer sequences are further composed into tasks making up a procedure. Similar observations of sets of expert performances are parsed into the broad taxonomic library that the system employs to segment automatically trainee performance data sets, to identify where they perform sequences similarly to the experts, where and how they differ, and ultimately provide feedback in support of the learning process.

Figure 8A:
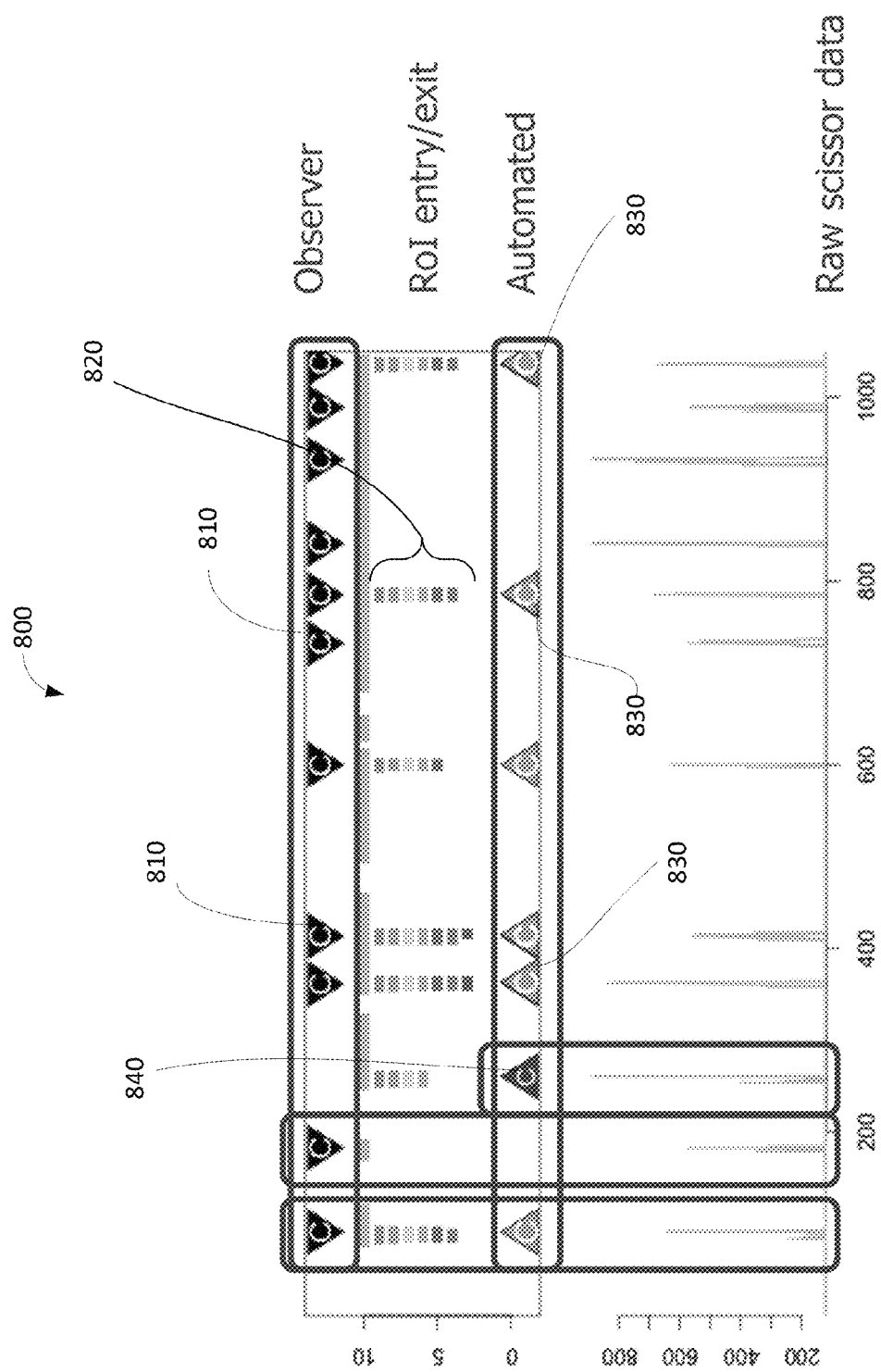
FIG. 8A is a diagram representing an output generated by the computer-program product of the system when an event, defined according to a gesture-recognition algorithm of the invention, has been detected by the system.
Figure 8B:
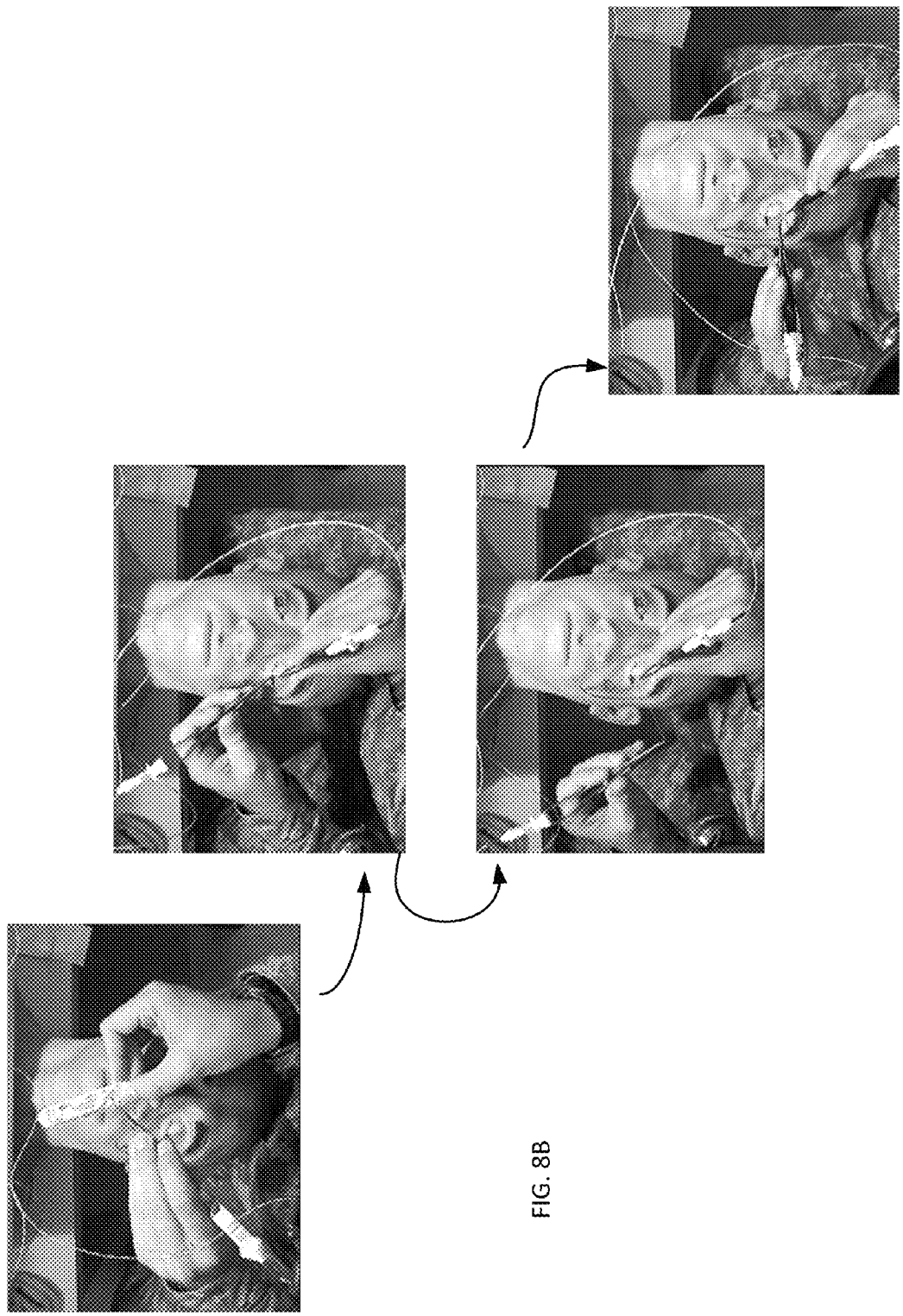
FIG. 8B shows a sequence of video-frames captured by a camera of the optical module and positioning of the instrument held by a user suturing the upper eyelid laceration on replaceable trauma module.

Identifying actions at each level of such taxonomy provides the opportunity to provide the best evaluation metrics at the most appropriate moment during the scenario. Depending on the training goals, this may be evaluation of decision processes, confirmation of correct sequencing of sub-tasks or gestures, or, when required, detailed analysis of a subset of the motion data within a gesture. At the same time, it allows exclusion from the evaluation process of extraneous motions (e.g. interacting with other colleagues or with the environment). FIG. 8A schematically illustrates an output generated by the computer-program product of the system 100 when an event has been detected, while FIG. 8B shows a sequence of video-frames captured by the web camera 118 of the optical module 110 and showing positioning of the instrument held by a user suturing the upper eyelid laceration on replaceable trauma module. In reference to FIG. 8A, black triangles 810 are manually recorded scissor closure events generated by an observer simultaneously with the simulator collecting data, for the purpose of validating the EDSGR method. Color bars 820 show entry and exit from regions of interest away from eyelid (scissors rapidly traverse from instrument tray towards eye, dwell for a short period, then are returned). Green triangles 830 show combination of actions of a given instrument (scissors) that is present in the ROI proximal to the object of training. Red triangle 840 indicates a cut detected by system but missed by the manual recorder.

In various embodiments, the software architecture additionally governs and coordinates other simulator functions and interfacing with the various hardware components. The program code(s), implemented in an EDSGR computer-program product of the invention, support:

Video capture of images with the optical system 110 of FIG. 1A and compression of corresponding imaging data;

Capture of streaming position tracking data effectuated with instruments positioning as captured by a magnetic tracking system;

Synchronized playback of captured video and 3D-reconstruction of position tracking data for analysis and determination of the ROI location and current state of the system in the space of possible states (state space machine training) including scrolling, zooming, data selection and extraction, speeding/slowing playback speed;

Data acquisition from multiple position tracking systems, strain gage sensors, keyboard/mouse/SpaceNavigator (3Dconnexion) and optional auxiliary human interface devices cooperated with the system 100;

Calibration of instrument closure position and force applied to the instrument;

Characterization of position tracking system. Due to the presence of electronic and ferrous components of the system that cannot be avoided, the magnetic position tracking system may have distortions in measuring positions and orientations. The software architecture contains components for recording the measured positions/orientations that correspond with true geometric values—generated by holding the sensors at known locations within the sensing area—and calibrate the system so that true values are calculated from the imperfect, measured values.

In accordance with examples of embodiments, the surgical training simulator system and sub-systems thereof, as well as method for using thereof and method for motion analysis have been described. Where specific values and parameters chosen for these embodiments have been recited, it is to be understood that, within the scope of the invention, the values of all of parameters may vary over wide ranges to suit different applications.

The present invention may be embodied in different forms such as a system, method, or computer program product. For example, those skilled in the art should readily appreciate that functions, operations, decisions, etc. of all or a portion of a method of the invention may be implemented as computer program instructions, software, hardware, firmware or combinations thereof. Those skilled in the art should also readily appreciate that instructions or programs defining the functions of the present invention may be delivered to a processor in many forms, including, but not limited to, information permanently stored on non-writable storage media (e.g. read-only memory devices within a computer, such as ROM, or devices readable by a computer I/O attachment, such as CD-ROM or DVD disks), information alterably stored on writable non-transitory tangible storage media (for example, floppy disks, removable flash memory and hard drives) or information conveyed to a computer through communication media, including wired or wireless computer networks.

In addition, while the invention may be embodied in software, the functions necessary to implement the invention may optionally or alternatively be embodied in part or in whole using firmware and/or hardware components (such as combinatorial logic, Application Specific Integrated Circuits or ASICs, Field-Programmable Gate Arrays or FPGAs, or other hardware or some combination of hardware, software and/or firmware components), and may include a specific electronic circuitry or a processor controlled by instructions stored in a tangible, non-transient memory medium. The computer-usable or computer-readable medium may be, for example, an electronic, magnetic, optical, electromagnetic, infrared, or semiconductor system, apparatus, device, or propagation medium. For example, computer-usable or computer-readable medium may include a tangible non-transitory storage medium, such as, without limitation, a random access memory (RAM), a read-only memory (ROM), an erasable programmable read-only memory (EPROM or Flash memory), a compact disc read-only memory (CDROM), and/or an optical storage memory medium, or any other memory, or combination thereof, suitable for storing control software or other instructions and data. The computer-usable or computer-readable medium may comprise and/or be complemented with an apparatus that contains, stores, communicates, propagates, or transports program code for use by or in connection with the instruction execution system, apparatus, or device. The computer program product may comprise program code stored in a computer readable medium that, when executed on a computing device, causes the computing device to perform and/or govern one or more of the processes described herein. The computer program product can be written in any conventional programming language (such as, in one example, C++).

References throughout this specification to "one embodiment," "an embodiment," "a related embodiment," or similar language mean that a particular feature, structure, or characteristic described in connection with the referred to "embodiment" is included in at least one embodiment of the present invention. Thus, appearances of the phrases "in one embodiment," "in an embodiment," and similar language throughout this specification may, but do not necessarily, all refer to the same embodiment. It is to be understood that no portion of disclosure, taken on its own and in possible connection with a figure, is intended to provide a complete description of all features of the invention.

In addition, it is to be understood that no single drawing is intended to support a complete description of all features of the invention. In other words, a given drawing is generally descriptive of only some, and generally not all, features of the invention. A given drawing and an associated portion of the disclosure containing a description referencing such drawing do not, generally, contain all elements of a particular view or all features that can be presented is this view, for purposes of simplifying the given drawing and discussion, and to direct the discussion to particular elements that are featured in this drawing. A skilled artisan will recognize that the invention may possibly be practiced without one or more of the specific features, elements, components, structures, details, or characteristics, or with the use of other methods, components, materials, and so forth. Therefore, although a particular detail of an embodiment of the invention may not be necessarily shown in each and every drawing describing such embodiment, the presence of this detail in the drawing may be implied unless the context of the description requires otherwise. In other instances, well known structures, details, materials, or operations may be not shown in a given drawing or described in detail to avoid obscuring aspects of an embodiment of the invention that are being discussed. Furthermore, the described single features, structures, or characteristics of the invention may be combined in any suitable manner in one or more further embodiments.

Disclosed aspects of the invention may be combined in ways not listed above. Accordingly, the invention should not be viewed as being limited to the disclosed embodiment(s).

What is claimed is:

1. A surgical training simulator system, comprising:
a housing structure;
an optical module affixed to the housing structure and including
an optical camera positioned to capture images in light received from a workspace that includes a field-of-view (FOV) of the of the optical camera;
a lighting system structured to illuminate said workspace; and
a projector configured to form an image, of a display of the projector, in said workspace in light received from said display of the projector;
and
tangible, non-transitory computer-readable storage medium having computer-readable program code thereon, the computer-readable program code including
program code for generating, with electronic circuitry of the surgical training simulator system and for each motion from a set of motions that have been tabulated for a surgical procedure performed with an instrument within the workspace, an event output representing an occurrence of re-alignment of the instrument when data, acquired with the electronic circuitry, indicate that a change in operational status of the instrument has crossed a predetermined operational threshold; and
program code for creating a multi-level hierarchy of descriptors representing changes in the operational status of the instrument by determining identifiable portions of the motion based on combination of multiple event outputs.

2. A system according to claim 1, further comprising a microscope system disposed such that a microscope system FOV covers at least a portion of the workspace, the microscope system including
a microscope system display;
an optical relay system providing optical communication between said microscope system display and an eyepiece of the microscope system; and
a beamsplitter disposed between the eyepiece and the optical relay system such as to make first and second optical paths coincide between the beamsplitter and the eyepiece,
wherein the first optical path corresponds to an optical path of light directed by said microscope system from an object under test to the eyepiece, and
wherein the second optical path corresponds to an optical path of light directed by said microscope system from the microscope system display to the eyepiece.

3. A system according to claim 2, wherein said microscope system is structured to form an image of the object under test at a first image plane and an image of the microscope system display at a second image plane, the first and second image planes coinciding with one another.

4. A system according to claim 2, wherein said optical relay system is configured such that an image of the microscope system display is formed by the microscope system with a coefficient of magnification less than one.

5. A system according to claim 1, wherein said optical module further includes a reflector disposed in cooperation with the housing structure to deliver image-forming light between the workspace and the optical camera and between the workspace and the display of the projector.

6. A system according to claim 1, wherein said data includes one or more of
(i) positional data calculated based on data acquired from a positional sensor of the instrument, the positional data representing a movement of a tip of the instrument across a boundary of a pre-defined spatial region of interest (ROI) defined within the workspace, and
(ii) force data acquired from a force sensor of the instrument, the force data representing one or more of force applied to the instrument and data derived from said force.

7. A system according to claim 1, further comprising at object of training in the workspace, the object of training having a structure representative of human anatomy and a trauma module replaceably attachable to said structure.

8. A system according to claim 7, wherein said trauma module includes at least one of
(i) an artificial structure representing at least one of skin, tarsal plate, and conjunctiva, said artificial structure having stiffness and mechanical strength values representing said at least one of skin, tarsal plate, and conjunctiva, and
(ii) an artificial structure representing at least one of canaliculi and puncta of an eyelid arranged in structural communication with a nasal airway structure.

9. A system according to claim 7, wherein said trauma module includes an incision sensor configured to detect incision of an instrument into the trauma module and, in response to such incision, generate data based on which the electronic circuitry determines a path of said incision through the trauma module.

10. A system according to claim 9, wherein said incision sensor includes at least one of
(i) a layered structure containing first and second layers, each of the first and second layers having a conductive material disposed along two opposing edges of the corresponding layer. and
(ii) a layered structure containing first and second layers, each of the first and second layers having stripes of conductive material disposed along two opposing edges thereof, and further containing a third layer having a conductive material disposed around a perimeter thereof.

11. A system according to claim 1, wherein the computer-readable program code further includes program code for determining a deviation of said multi-level hierarchy of descriptors from a reference hierarchy to generate a mismatch output representing whether the deviation is within a tabulated acceptable range; and program code for forming, based on the mismatch output, an optical image containing a diagram that represents analysis of changes in the operational status and displaying said optical image.

12. A method for motion analysis with a surgical training simulator system, the method comprising:

for each motion from a set of motions that have been tabulated for a surgical procedure performed with an instrument within a workspace defined around an object of surgical training and including a field-of-view (FOV) of an optical system of the simulator system, with electronic circuitry of the simulator system:

generating an event output representing an occurrence of re-alignment of the instrument when data, acquired with a detection unit of the system indicate that a change in operational status of the instrument has crossed a predetermined operational threshold;

creating a multi-level hierarchy of descriptors representing changes in the operational status of the instrument by determining identifiable portions of the motion based on combination of multiple event outputs;

determining a deviation of said multi-level hierarchy of descriptors from a reference hierarchy to generate a mismatch output representing whether the deviation is within a tabulated acceptable range; and based on the mismatch output, displaying an optical image with a diagram representing analysis of changes in the operational status.

13. A method according to claim 12, wherein the generating includes generating an event output in response to at least one of (i) positional data acquired from a positional sensor of the instrument, the positional data representing a movement of a tip of the instrument across a boundary of a pre-defined spatial region of interest (ROI) defined within the workspace;

(ii) comparing the positional data with optical data acquired by an optical system of the simulator system and representing a position of a sensor of the simulator system within the workspace; and (iii) force data acquired from a force sensor of the instrument, the force data representing one or more of force applied to the instrument and data derived from said force.

14. A method according to claim 12, wherein the creating includes combining multiple event outputs to form a description of a gesture, the gesture being a portion of the tabulated motion.

15. A method according to claim 12, wherein the creating includes combining multiple gestures to form a description of a set of sub-tasks, said description fully describing the motion.

16. A method according to claim 12, wherein said combining includes discarding an event output when a description of a gesture formed corresponds to a gesture that is not identifiable by the simulator system.

17. A method according to claim 12, wherein said displaying includes projecting an image of a display configured to generate said diagram onto the object of surgical training.

18. A method according to claim 12, wherein said displaying includes displaying a video-frame with an image of instrument in the workspace in spatial relation to the object of surgical training.

19. A method according to claim 12, further comprising acquiring data from an incision sensor disposed in an object of training of said simulator system, said incision sensor including a layered structure with first and second layers, each of the first and second layers having stripes of conductive material disposed along two opposing edges thereof.

20. A method according to claim 19, wherein said acquiring includes acquiring data from an incision sensor configured to detect incision of an instrument into a trauma module of the object of training, and further comprising in response to said incision, generating data based on which the electronic circuitry determines a path of said incision through the trauma module.

* * * * *